US006364990B1

(12) United States Patent
Grosskopf et al.

(10) Patent No.: US 6,364,990 B1
(45) Date of Patent: Apr. 2, 2002

(54) METHOD FOR FORMING PRIMARY LABEL WITH REMOVABLE SELF-ADHESIVE LABELS

(75) Inventors: Glenn A. Grosskopf, Lake Zurich, IL (US); Carl W. Treleaven, Greensboro, NC (US)

(73) Assignee: Pharmagraphics (Southeast) L.L.C., Greensboro, NC (US)

(*) Notice: Subject to any disclaimer, the term of this patent is extended or adjusted under 35 U.S.C. 154(b) by 0 days.

(21) Appl. No.: 09/378,689

(22) Filed: Aug. 20, 1999

Related U.S. Application Data

(62) Division of application No. 08/761,988, filed on Dec. 11, 1996, now Pat. No. 6,035,568, which is a continuation-in-part of application No. 08/647,466, filed on May 3, 1996, now Pat. No. 5,738,381, which is a continuation-in-part of application No. 08/533,082, filed on Sep. 25, 1995, now abandoned, which is a continuation of application No. 08/943,458, filed on Oct. 3, 1997, now Pat. No. 5,829,789.

(51) Int. Cl.[7] .................................... B32B 31/00

(52) U.S. Cl. .................... 156/268; 156/252; 156/253; 156/270; 156/277; 156/289; 156/291; 283/70; 283/81; 283/104; 283/105

(58) Field of Search ........................ 156/252, 268, 156/253, 257, 270, 277, 289, 291; 283/70, 81, 104, 105

(56) References Cited

U.S. PATENT DOCUMENTS

| | | | | |
|---|---|---|---|---|
| 3,484,976 A | | 12/1969 | Shea | 40/310 |
| 3,593,443 A | | 7/1971 | Demetrius, Jr. et al. | 40/638 |
| 3,702,511 A | | 11/1972 | Miller | 40/306 |
| 3,822,492 A | | 7/1974 | Crawley | 40/638 |
| 4,128,954 A | | 12/1978 | White | 40/310 |
| 4,479,838 A | | 10/1984 | Dunsirn et al. | 156/247 |
| 4,727,667 A | | 3/1988 | Ingle | 40/306 |
| 4,910,058 A | | 3/1990 | Jameson | 428/42.3 |
| 4,964,512 A | | 10/1990 | Ingram et al. | 206/459.5 |
| 4,964,513 A | | 10/1990 | Ingram et al. | 206/459.5 |
| 5,007,663 A | | 4/1991 | Moran | 283/81 |
| 5,074,595 A | | 12/1991 | Hill et al. | 283/81 |
| 5,172,936 A | | 12/1992 | Sullivan et al. | 283/81 |
| 5,182,152 A | | 1/1993 | Ericson | 428/40.9 |
| 5,227,209 A | | 7/1993 | Garland | 428/42.1 |
| 5,238,720 A | | 8/1993 | Volkman | 428/41.3 |
| 5,271,642 A | | 12/1993 | Jahier et al. | 283/81 |
| 5,284,363 A | | 2/1994 | Gartner et al. | 283/81 |
| 5,290,616 A | | 3/1994 | Cowan et al. | 428/41.8 |
| 5,329,713 A | | 7/1994 | Lundell | 40/306 |
| 5,342,093 A | | 8/1994 | Weernink | 283/81 |
| 5,350,612 A | | 9/1994 | Stern et al. | 428/40.5 |
| 5,352,155 A | | 10/1994 | Fahey | 462/25 |
| 5,547,227 A | | 8/1996 | Laurash et al. | 283/81 |
| 5,702,127 A | * | 12/1997 | Korondi, Jr. | 283/81 |
| 5,704,648 A | | 1/1998 | Brown et al. | 283/81 |
| 5,738,381 A | * | 4/1998 | Treleaven et al. | 283/81 |

FOREIGN PATENT DOCUMENTS

| | | | |
|---|---|---|---|
| EP | 0 349 670 | | 1/1990 |
| EP | 594505 | | 4/1994 |
| FR | 2 402 264 | | 3/1979 |
| FR | 2 722 021 | * | 1/1996 |

* cited by examiner

*Primary Examiner*—Linda Gray
(74) *Attorney, Agent, or Firm*—Myers Bigel Sibley & Sajovec

(57) ABSTRACT

Methods are provided for forming a label product made up of first and second types of labels formed integrally together in which the first type includes primary information to be used on a first type of substrate and the second type includes secondary information to be used on a second type of substrate.

7 Claims, 16 Drawing Sheets

METHOD FOR FORMING PRIMARY LABEL WITH REMOVABLE SELF-ADHESIVE LABELS

This is a divisional application of application Ser. No. 08/761,988, filed Dec, 11 1996 now U.S. Pat. No. 6,035,568, which is a continuation-in-part application of Ser. No. 08/647,466, filed May 3, 1996, now U.S. Pat. No. 5,738,381, which is a continuation-in-part of Ser. No. 08/533,082, filed Sep. 25, 1995 and abandoned in favor of file wrapper continuation application Ser. No. 08/943,458, filed Oct. 3, 1997, now U.S. Pat. No. 5,829,789.

FIELD OF THE INVENTION

The present invention is directed to labels, and, more particularly, to a primary label having integrally formed and removable secondary labels attached thereto.

BACKGROUND OF THE INVENTION

Labels, for example self-adhesive labels, are commonly used to display various indicia or information regarding a chosen object. The labels may be applied to a package or container to identify the contents thereof and/or relate information concerning the contents. It has become increasingly desirable to provide such labels which include, as a part thereof, at least one removable portion which the user may detach from the package.

It is known, for example, to provide labels having removable coupon portions so that the consumer may remove and redeem the coupon at the point of sale. The remainder of the label may remain with the package and may include indicia relating thereto. Because these removable portions are intended to function as conventional coupons once removed, they are typically non-adhesive once removed. Examples of the aforedescribed labels are shown in U.S. Pat. No. 5,172,936 to Sullivan et al. and U.S. Pat. No. 5,329,713 to Lundell.

It is also known to provide pressure sensitive labels consisting of an adhesive backed release liner having a self-adhesive backed layer of face stock or the like releasably adhered to the release side of the liner. Such labels may be referred to as "piggy back" labels. After the label has been adhered to a package by means of the adhesive of the release liner, the end user may remove the layer of face stock and reapply it to another substrate using the adhesive on the back of the face stock. These labels are only provided with indicia on the upper surface of the face stock so that, when the upper ply is removed from the label, no indicia disposed on the remaining portion of the label is left to identify or characterize the package. A variation of the above described "piggy back" label is shown in U.S. Pat. No. 3,822,492 to Crawley wherein the disclosed label is adhered to the package by adhesive disposed on portions of the face stock with a non-adhesive backed release liner interposed between the remainder of the face stock and the package.

While tile above described label products may be suitable for their intended uses, they are wholly inadequate for other applications. For example, in pharmaceutical and similar applications a bulk container is provided to a distributor such as a pharmacist or physician to be subdivided and repackaged. Two concerns arise in such case. First, the bulk container must provided with identifying and descriptive information. The information may include, for example, warnings, advertising, dosage instructions, disclaimers, and lot and expiration data. To ensure that the contents are positively identified and the integrity of the warnings, etc., are brought to the attention of the distributor, this information should be permanently secured to the bulk container. Secondly, provision should be made for conveniently and accurately identifying and describing the contents of the subdivision packages (e.g., containers in which prescribed quantities are distributed to patients). To ensure that the contents are positively identified and the integrity of the warnings, etc., are brought to the attention of the end users, this information should be permanently secured to the second containers.

The label designs of the prior art do not meet the needs of the bulk packaging/repackaging set forth above. In the case of the labels of the first design discussed (i.e., having removable coupons) no provision is made for securing the removable portion to a second substrate, for example, the second container. In the case of the "piggy back" labels, no provision is made for permanently securing indicia to the bulk container.

Accordingly, there exists a need for a label product which provides a primary portion which may be permanently secured to a first object and one or more second portions which are initially carried by the label product on the first object, but may be conveniently removed and permanently secured to a second object. In addition to the above described application, a label product making such provisions would also have many other advantageous uses such as, for example, a product label having removable novelty stickers.

There is a need for such a label product which may be, when positioned on the first object, opened to remove one or more of the second portions and resealed to protect one or more further second portions remaining on the label product.

There is a need for a label product as described above which allows for convenient and effective selection of release materials, stock materials, and adhesives as needed for the intended first and second objects.

There exists a need for a method for forming label products as described above which is efficient and cost effective.

SUMMARY OF THE INVENTION

The present invention is directed to a label product for attaching to a package and having, as a part thereof. at least one removable portion which the user may detach from the package and reapply to a second package. Generally, the label product is made up of first and second types of labels formed integrally together. The first type includes primary information to be used on a first type of package and the second type includes secondary information to be used on a second type of package.

In some embodiments, the label product includes a permanent portion having an upper surface and a lower surface. The lower surface is coated with a first adhesive which is operative to substantially permanently secure the permanent portion to the first package. The label product further includes a primary label integrally formed with and as a part of the permanent portion. The primary label has an upper surface and a lower surface. The upper surface has primary indicia thereon representing the primary information concerning the first type of package. The label product also includes at least one temporary portion removably secured to the permanent portion such that the temporary portion may be selectively removed from the first package. A secondary label forms a part of the temporary portion. The secondary label has an upper surface and a lower surface. The upper surface has secondary indicia thereon representing the secondary information concerning the second type of package. The secondary label is adhesively and releasably adhered to the remainder of the label product by a varnish coating and a second adhesive such that the secondary label may be selectively removed from the remainder of the label product and applied to one of the second types of packages.

Preferably, the label. product includes a plurality of the secondary labels.

The label product as described above may be constructed in several forms, as set forth below.

The label product may include a base layer having a lower surface and an upper surface, the first adhesive being disposed on the lower surface of the base layer. A top layer overlies the base layer and has a lower surface and an upper surface. The primary label and the secondary label each form a part of the top layer. The second adhesive is disposed on the lower surface of the top layer. The varnish coating covers a portion of the upper surface of the base layer and a portion-of the upper surface of the base layer is not covered by the varnish coating. The covered portion is disposed beneath the secondary label and the uncovered portion is disposed beneath the primary label.

The label product may be constructed such that the permanent portion includes a first panel having an upper surface and a lower surface. The primary indicia is disposed on the upper surface of the first panel and the first adhesive is disposed on the lower surface of the first panel. The temporary portion includes a second panel joined to an edge of the first panel by a fold. The secondary label is releasably adhered to the second panel by the second adhesive. The secondary label may be adhered to an interior surface of the second panel, the varnish coating being disposed on the interior surface adjacent the second adhesive. The label product may further include a laminate cover adhered to an exterior surface of the second panel and a marginal portion extending beyond an edge of the second panel. Moreover, the first panel may include an edge flap extending beyond an adjacent edge of the second panel, the marginal portion being releasably and resealably adhered to the edge flap by a laminate adhesive. The second panel may be detachably joined to the first panel.

The label product as first described may include a base layer having a lower surface and an upper surface. The first adhesive is disposed on the lower surface and the varnish coating is disposed on the upper surface. A top layer overlies a portion of the upper surface of the base layer. The top layer has a lower surface and an upper surface. The secondary label forms a part of the top layer. The secondary indicia is disposed on the upper surface of the top layer and the second adhesive is disposed on the lower surface of the top layer. The entirety of the portion of the upper surface of the base layer is covered by the varnish coating, whereby the entirety of the top layer is releasably adhered to the portion by the second adhesive and the varnish coating. Preferably, the entirety of the upper surface of the base layer is covered by the varnish coating.

The label product as described in the immediately preceding paragraph may be constructed in various forms, as discussed hereinbelow.

The label product may include a tertiary label forming a part of the top layer and overlying a second portion of the upper surface of the base layer. The tertiary label has an upper surface, a lower surface, and tertiary indicia disposed on its upper surface. The second adhesive is disposed on the lower surface of the tertiary label. The primary indicia is disposed on the upper surface of the base layer and the tertiary label overlies the primary indicia. The tertiary indicia may be substantially identical to the primary indicia. Preferably, the entirety of the upper surface of the base layer is covered by the varnish coating.

Alternatively, the label product may be constructed such that the upper surface of the base layer includes an exposed portion which is not covered by the top layer. The primary indicia is disposed on the exposed portion. Preferably, the entirety of the upper surface of the base layer is covered by the varnish coating.

Alternatively, the label product may be formed such that the primary label forms a part of the top layer. The primary label extends beyond and does not overlie the base layer. Preferably, the entirety of the upper surface of the base layer is covered by the varnish coating.

Alternatively, the label product may be constructed such that the base layer includes first and second panels joined to one another at a fold. Each of the panels has an upper surface and a lower surface. The first adhesive is disposed on the lower surface of the first panel but not on the lower surface of the second panel. The primary indicia is disposed on the upper surface of the first panel. The top layer overlies the upper surface of the second panel. The first and second panels may be detachably joined at the fold by a tear line. Preferably, the entireties of the upper surfaces of the first and second panels are covered with the varnish coating. The top layer may be substantially transparent.

The present invention is further directed to a "single ply" label product made up of first and second types of labels formed integrally together in which the first type includes primary information to be used on a first type of substrate and the second type includes secondary information to be used on a second type of substrate. The label product includes a base layer having upper and lower surfaces. A base adhesive is disposed on the lower surface of the base layer. A permanent portion forms a part of the base layer and has upper and lower surfaces. The lower surface of the permanent portion is coated with a first portion of the base adhesive. The first adhesive portion is operative to directly and substantially permanently secure the permanent portion to the first type of substrate. The upper surface of the permanent portion has primary indicia thereon. The primary indicia represents the primary information concerning the first type of substrate. A temporary portion also forms a part of the base layer and is formed by cut lines therein. The temporary portion has upper and lower surfaces. The lower surface of the temporary portion is coated with a second portion of the base adhesive. The upper surface of the temporary portion has secondary indicia thereon, the secondary indicia representing the secondary information regarding the second type of substrate. The temporary portion is selectively removable from the first substrate and readherable to one of the second types of substrates.

The label product as described above may include a plurality of the temporary portions. Preferably, the cut lines define at least one tie forming a part of the base layer and connecting the permanent and temporary portions. The temporary portion or portions may include a pull tab extending beyond an edge of the permanent portion.

In one embodiment of the single ply label product as described above, the second portion of the base adhesive has a lower surface coated with a pattern of adhesive deadener such that a portion of the lower surface of the second portion is deadened and a portion of the lower surface of the second portion is exposed. The temporary portion is releasably adherable to the first type of substrate and is readherable to the second type of substrate by the exposed adhesive.

In another embodiment of the singly ply label product as described above, the second portion of the base adhesive has a lower surface coated with adhesive deadener. The adhesive deadener has a lower surface coated with a low tack adhesive. The temporary portion is releasably adherable to the first type of substrate and is readherable to the second type of substrate by the low tack adhesive. The low tack adhesive separates from the first type of substrate and remains with the lower surface of the adhesive deadener when the temporary portion is removed from the first type of substrate.

In yet another embodiment of the single ply label product as described above, the second portion of the base adhesive coats the lower surface of the temporary portion in a prescribed pattern. The pattern defines a remainder of the lower surface of the temporary portion which is adhesive-free.

The present invention is further directed to a method for forming single ply label products as described above. The method includes unwinding a base web having upper and lower surfaces and a base adhesive coating the lower surface. Adhesive deadener is selectively applied to the base adhesive in a pattern such that at least a portion of the base adhesive is coated with the adhesive deadener and at least a portion of the base adhesive remains exposed. Primary and secondary indicia are printed on the upper surface of the base web. The primary indicia represents the primary information concerning the first type of substrate and the secondary indicia represents the secondary information concerning the second type of substrate. The base web is cut to form cut lines defining a permanent portion and a temporary portion, each forming a part of the base web. The base web is cut such that the primary indicia is disposed on the permanent portion and the secondary indicia is disposed on the temporary portion. Further, the base web is cut such that at least a portion of the adhesive deadener underlies the temporary portion.

The method as just described may further include the step of curing the adhesive deadener following the step of applying the adhesive deadener. A release liner may be married to the base adhesive of the base web following the step of applying the adhesive deadener. Also, the release liner may be delaminated from the base web prior to applying the adhesive deadener. The method may further include the step of cutting the base web to form cut lines. The cut lines define at least one tie forming a part of the base layer and connecting the permanent and temporary portions.

The present invention is directed to a further method for forming single ply label products as follows. A base web having upper and lower surfaces and a base adhesive coating the lower surface is unwound. Adhesive deadener is selectively applied to the base adhesive. A second adhesive is applied to the adhesive deadener. Primary and secondary indicia are printed on the upper surface of the base web. The primary indicia represents the primary information concerning the first type of substrate and the secondary indicia represents the secondary information concerning the second type of substrate. The base web is cut to form cut lines defining a permanent portion and a temporary portion, each forming a part of the base web. The base web is cut such that the primary indicia is disposed on the permanent portion and the secondary indicia disposed on the temporary portion. Further, the base web is cut such that at least a portion of the adhesive deadener and at least a portion of the second adhesive underlie the temporary portion.

The above described method may further include the step of curing the adhesive deadener following the step of applying the adhesive deadener. A release liner may be married to the base adhesive of the base web following the step of applying the adhesive deadener. Also, the release liner may be delaminated from the base web prior to applying the adhesive deadener. The method may further include the step of cutting the base web to form cut lines. The cut lines define at least one tie forming a part of the base layer and connecting the permanent and temporary portions.

The present invention is directed to yet another method for forming single ply label products as follows. A base web having upper and lower surfaces is unwound. Adhesive is selectively applied to the lower surface so as to form a prescribed pattern of the adhesive such that a remainder of the lower surface is adhesive-free. Primary and secondary indicia are printed on the upper surface of the base web. The primary indicia represents the primary information concerning the first type of substrate and the secondary indicia represents the secondary information concerning the second type of substrate. The base web is cut to form cut lines defining a permanent portion and a temporary portion, each forming a part of the base web. The base web is cut such that the primary indicia is disposed on the permanent portion and the secondary indicia is disposed on the temporary portion. Further, the base web is cut such that at least a portion of the adhesive-free remainder and at least a portion of the adhesive underlie the temporary portion.

In the above described method, a release liner may be married to the base adhesive of the base web following the step of applying the adhesive. The method may further include the step of cutting the base web to form cut lines. The cut lines define at least one tie forming a part of the base layer and connecting the permanent and temporary portions.

An object of the present invention is to provide a label product including primary and secondary labels, the primary label adapted to substantially permanently secure the label product to a first object, and the secondary label adapted to be removed from the first object and substantially permanently secured to a second object.

A further object of the present invention is to provide such a label product wherein the primary label includes selected primary indicia and the secondary label includes selected secondary indicia.

Moreover, an object of the present invention is to provide such a label product comprising a plurality of such secondary labels.

An object of the present invention is to provide a label product as described above having multiple panels each of which include secondary labels releasably secured thereto.

A primary object of the present invention is to provide such a label product which allows for discretionary selection of adhesives, release materials, and stock materials so that a given label product may be customized to the intended application.

A further object of the present invention is to provide a method for forming label products as set forth above.

Yet another object of the present invention is to provide such a method which is convenient and cost effective.

The preceding and further objects of the present invention will be appreciated by those of ordinary skill in the art from a reading of the Figures and the detailed description of the preferred embodiment which follow, such description being merely illustrative of the present invention.

DETAILED DESCRIPTION OF THE PREFERRED EMBODIMENT

Figure 1:
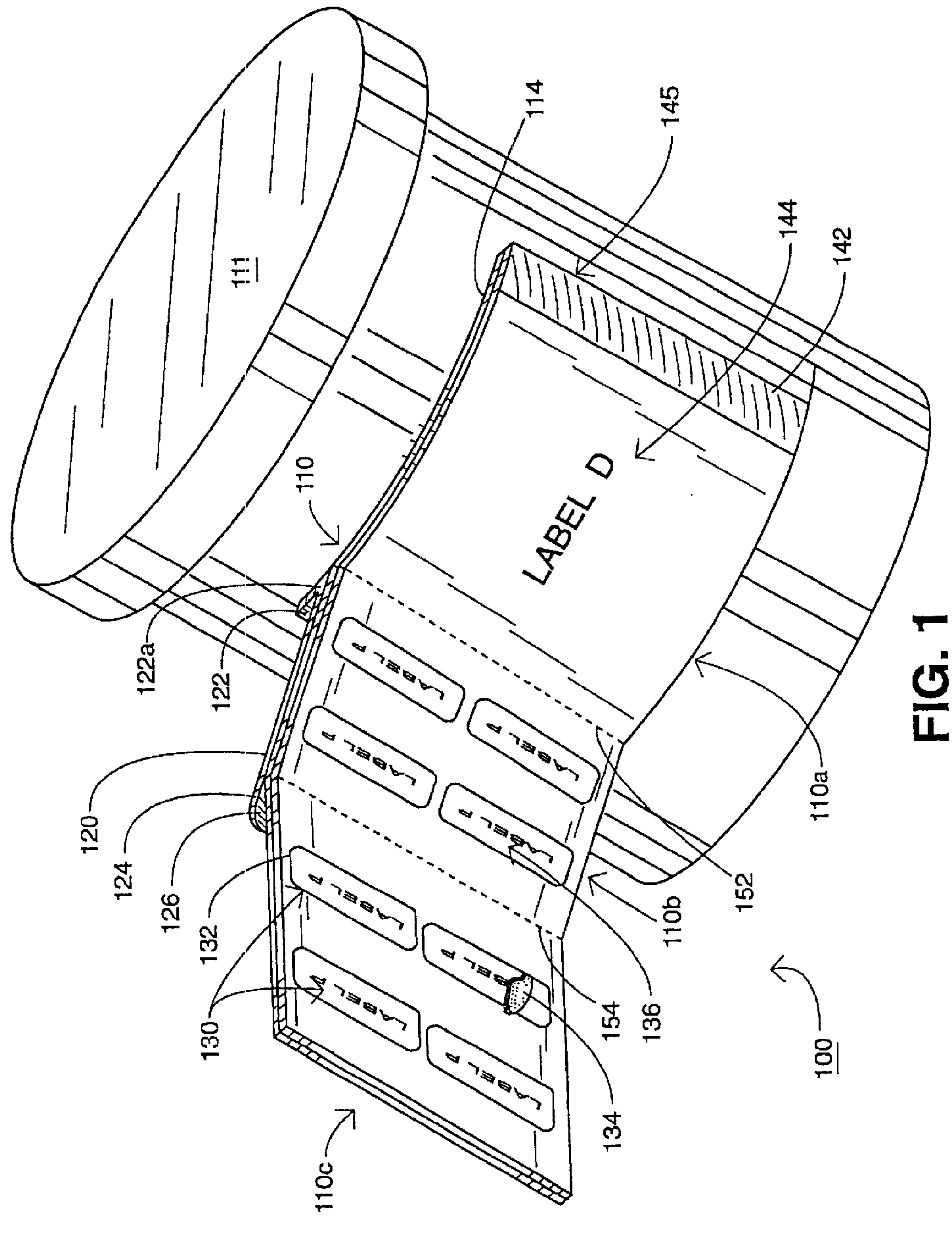
FIG. 1 is a perspective view of a label incorporating a leaflet according to the present invention and mounted on a container, wherein the label is shown in an open configuration with one of the secondary labels partially removed.
Figure 2:
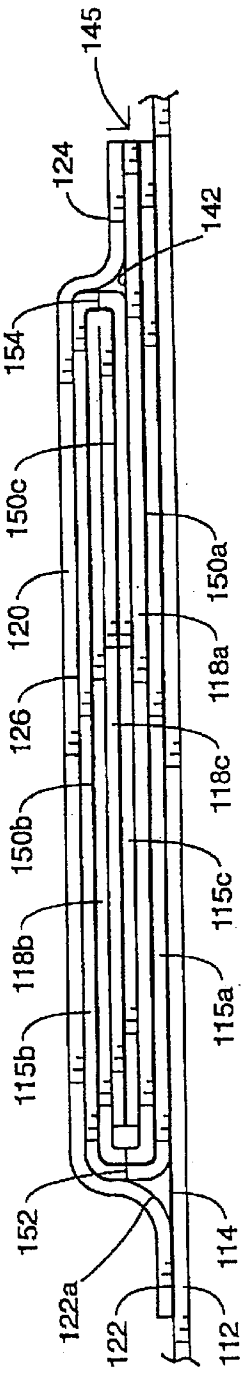
FIG. 2 is a side elevational view of the label of FIG. 1 shown in a closed configuration and mounted on the release liner.

With reference to FIGS. 1 and 2, a label according to a first embodiment of the present invention, generally denoted by the numeral 100, is shown therein. Label 100 comprises multi-layer, multipanel leaflet 110 covered by laminate cover 120 and disposed on adhesive patch 114 which is in turn disposed on release liner 112 or, for example, on container 111.

Figure 3:
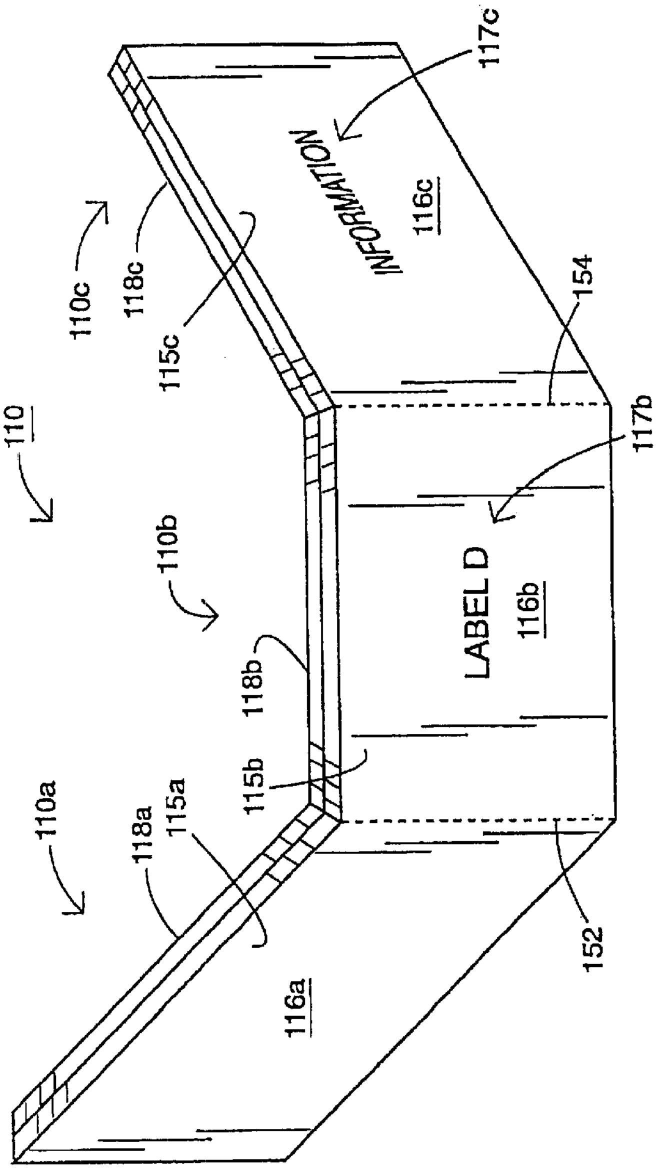
FIG. 3 is a perspective view of the leaflet according to the present invention.

Leaflet 110 is also shown, without the remaining portions of label 100, in FIG. 3. Leaflet 110 includes leaflet panels 110*a*, 110*b*, 110*c*. Panels 110*a*, 110*b*, 110*c* are relatively detachable by means of tear lines 152,154.

Panel 110*a* is removably secured to and carried by a release liner 112 (FIG. 2) by pressure sensitive adhesive 114, and serves as a primary label which may be permanently secured by means of the adhesive to a container 111 (FIG. 1), such as a pharmacist's supply container.

Panels 110*b*, 110*c* each include a plurality of secondary labels 130. Each of secondary labels 130 are defined by cut lines 132 and are releasably secured to their respective panel 110*b*, 110*c* by means of pressure sensitive adhesive 134. Each secondary label 130 may be removed from leaflet 110 and secured by means of adhesive 134 to a container, for example, such as a patient's individual container.

Laminate cover 120 is secured to outer surface 116*b* of leaflet 110 by adhesive 126 and is removably secured to release liner 112 (FIG. 2) by marginal portion 122 and adhesive 114. Laminate cover 120 includes tear line 122*a* so that, when marginal portion 122 is secured to container 111 by means of adhesive 114 (FIG. 1) and the user wishes to remove laminate cover 120 (along with panels 110*b*, 110*c*), he or she may do so by tearing along tear line 122*a*. Label 100 is openable and resealable by means of the adhesive 126 at marginal portion 124 which interfaces with varnish strip 142 disposed on the upper surface of edge flap 145 of primary label 110*a*.

Turning to leaflet 110 in greater detail, each of panels 110*a*, 110*b*, and 110*c* consist of a first layer and a second layer. Primary label or panel 110*a* includes first layer 115*a* and second layer 118*a*; panel 110*b* includes first layer 115*b* and second layer 118*b*; panel 110*c* includes first layer 115*c* and second layer 118*c*. The first and second layers of each of panels 110*a*, 110*b*, and 110*c* are adhered together by means of pressure sensitive adhesive layers 150*a*, 150*b*, and 150*c*, respectively. The surface of first layer 115*b* adjacent second layer 118*b* and the surface of first layer 115*c* adjacent second layer 118*c* are each coated with silicon varnish. Second layers 118*b* and 118*c* (and, thus, secondary labels 130) are thereby releasably secured to first layers 115*b* and 115*c*, respectively, by means of associated pressure sensitive adhesive layers 150*b* and 150*c*. Because the surface of first layer 115*a* adjacent second layer 118*a* is not provided with varnish, layers 115*a* and 118*a* are permanently bonded together. Adhesive patch 114 is permanently adhered to outer surface 116*a* of panel 110*a*. Cut lines 132 extend through layers 118*b*,118*c* down to layers 115*b*,115*c*.

Primary label or panel 110*a* may be provided with indicia 144. Secondary labels 130 are preferably provided with related indicia 136. Further indicia 117*b*, 117*c* may be provided on outer surfaces 116*b* and 116*c* of first layers 115*b* and 115*c*, respectively. Indicia could also be placed on outer surface 116*a* of panel 110*a*.

Leaflet 110 or label 110 incorporating leaflet 110 may be used in a number of varied applications. For example, leaflet 110 may be placed as an insert in a package so that the consumer or end user is provided with a plurality of removable self-adhesive labels for use as coupons, novelty stickers, or the like. Label 100 may be adhered to the outside of a package for the same purpose. In particular, if label 100 is used, the end user may open label 100 by pulling marginal portion 124 of laminate 120 away from primary label 110*a* at varnish strip 142. The end user then peels away one or more secondary labels 130 and can refold and reseal laminate cover 120. Leaflet 110 and label 100 are particularly well suited for use with bulk packaging of goods which are ultimately intended to be individually packaged, as discussed in more detail with respect to label 200 according to a second embodiment of the invention, below. Moreover, when the secondary labels 130 are depleted, or it is otherwise no longer desired to have panels 110*b* and 110*c* on the package, the user may remove panel 110*c* by means of tear line 154, or remove both panels 110*b* and 110*c* by means of tear lines 152 and 122*a*.

Leaflets 110 as described above may be formed as follows. A six color Mark Andy 2200 flexographic printing press available from Mark Andy, Inc. of Chesterfield, Mo. may be used to print leaflets 110, however, any suitable apparatus may be used. Other suitable apparatus include letter presses and offset presses.

Figure 4:
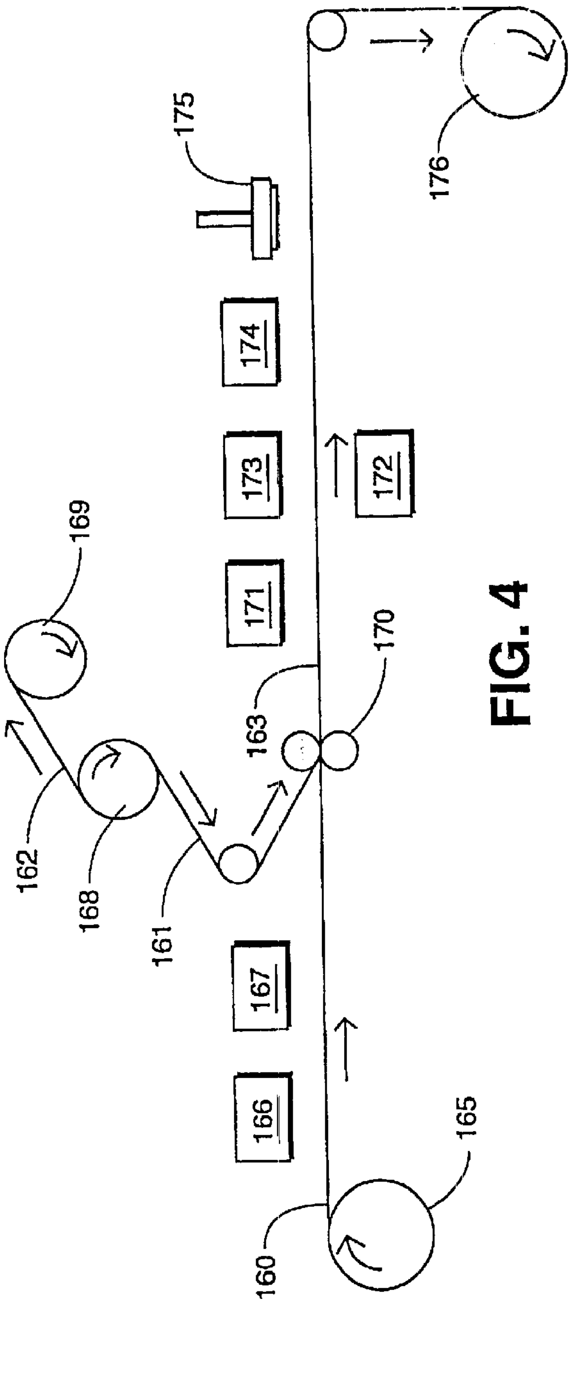
FIG. 4 is a schematic diagram showing an apparatus for forming leaflets according to the present invention.

With reference to FIG. 4, base web 160 is supplied from unwind stand 165. Simultaneous with the supply of base web 160, self-adhesive stock web 161 is supplied from unwind stand 168. Base web 160 ultimately forms first layers 115*a*, 115*b*, 115*c* of the resulting leaflets 110. Self-adhesive stock web 161, with release liner 162 removed, ultimately forms second layers 118*a*, 118*b*, 118*c* of leaflets 110.

Base web 160 is preferably a simple base stock formed from paper and having no adhesive layer or release liner. Base web 160 first passes through varnish printer station 166 at which point varnish is applied to selected portions of base web 160. More particularly, the selected portions correspond to the surfaces of first layers 115*b* and 115*c* adjacent second layers 118*b* and 118*c*. Thereafter, base web 160 passes through UV curing unit 167 in order to cure the applied varnish coating.

Self-adhesive stock web 161 may be provided as a self-adhesive face stock having a release liner, the release liner 162 simultaneously being removed to rewind stand 169. Self-adhesive stock web 161 may be, for example, high gloss paper with S246 adhesive available from Fasson of Painesville, Ohio.

Base web 160 and self-adhesive stock web 161 are married at nip rollers 170, thereby forming multi-layer composite web 163. Notably, where varnish has not been applied by varnish print station 166, the two webs are permanently adhered. Where varnish has been applied, the webs are releasably adhered.

Composite web 163 is drawn through one or more print stations 171 to apply indicia 136, 144. Composite web 163 is also passed through any number of print stations 172 to apply indicia 117*b*, 117*c*. Optionally, indicia may be printed on the upper surface of base web 160 prior to application of the varnish by a printing station (not shown).

Thereafter, composite web 163 is passed through varnish print station 173 which applies an overprint varnish to protect the aforesaid indicias. Varnish print station 173 may also be used to apply varnish strip 142. Coated composite web 163 is then passed through UV curing unit 174 to cure the varnish.

Composite web 163 is then die cut by die cut station 175 down to base web 160 to form die cuts 132 which define secondary labels 130. Optionally, the waste matrix defined outside the diecuts may be taken up on a rewind stand (not shown). This could be accomplished by providing a continuous waste matrix border alongside the portion of the web from which the leaflets are ultimately formed.

Composite web 163 may thereafter be "sheeted" into individual strips and stacked or, alternatively, rewound onto rewind stand 176 and later cut into individual strips. Alternatively, web 163 could be cut and folded on a roll folder.

The individual strips so formed may then be folded on a conventional folder, such as a Machine by Oppenheimer (MBO) available from MBO America of Illinois.

Although, in the description above, the two webs are married after varnish print station 166, the two webs could be married anywhere between the first and last print stations, permitting any number or combination of colors to be printed on each side of the web. Accordingly, one may print on the interior surfaces of first layers 115*b*, 115*c* (i.e., the surfaces ultimately adjacent second layers 118*b*,118*c*) so that indicia so printed can be seen when secondary labels 130 are removed from the leaflet. Preferably, UV curing unit 167 is portable so that it may be placed along the apparatus as desired.

Labels 100 may be formed using leaflets 110 by the following method.

Figure 5:
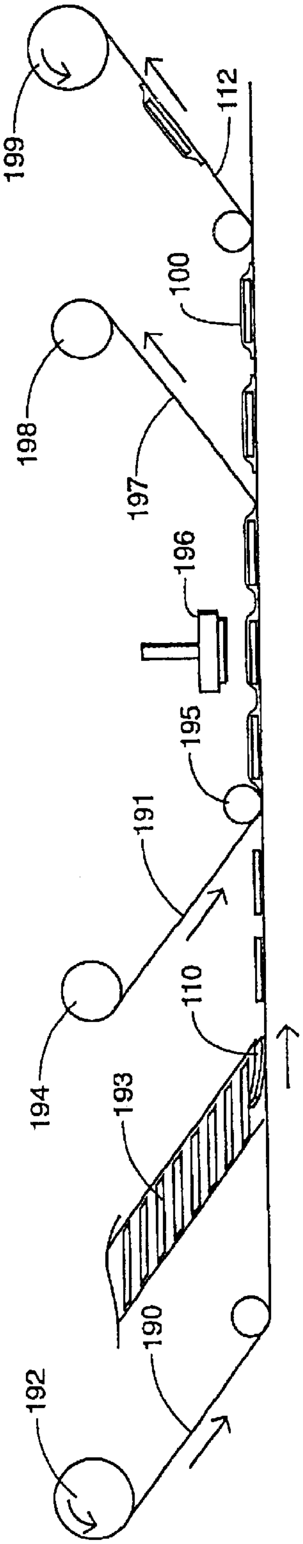
FIG. 5 is a schematic diagram showing an apparatus for forming labels according to the present invention.

With reference to FIG. 5, transfer tape web 190 consisting of a release liner and an adhesive layer, for example, 3M Product #9447, 1 millimeter high tenacity tape with 320 adhesive, is supplied from unwind stand 192. Leaflets 110 are applied from leaflet applicator 193, for example, an Onsert Machine available from Onsert Systems of Toronto, Canada. Thereafter, adhesive backed laminate web 191 is supplied from unwind stand 194 and married to leaflets 110 and transfer tape web 190 by nip roller 195. The resulting construction is then die cut in the shape of labels 100 by die cut station 196. Waste matrix 197, typically comprising unwanted portions of laminate web 191, excess adhesive from transfer tape 190, and portions of the leaflet, is removed by rewind stand 198. The resulting labels 100 mounted on release liner 112 are then wound onto rewind stand 199.

It will be appreciated that, instead of transfer tape web 190, a conventional self-adhesive base stock comprising a face stock plus adhesive and a release liner may be used. As a further alternative, a double coated tape web such as 3M Scotch Brand Tape Product #9458, may be used as. well. Moreover, it will be appreciated that any conventional label construction designed to incorporate an extended text label may be practiced using leaflet 110 and may be formed by any conventional or suitable method.

It will be appreciated that the above-described method for forming leaflets 110 may be used to produce pressure sensitive label products other than labels 100 or the like. For example, leaflets 110 may be provided without an adhesive patch 114. Such leaflets may serve as inserts for carrying a plurality of pressure sensitive adhesive labels 130, as discussed below. Thus, it is contemplated that a variety of leaflet designs incorporating removable pressure sensitive labels and having printing on both sides and no release liner may be formed.

Further, it will be appreciated that leaflets 110 and labels 100 formed therefrom may include any number of panels in addition to panels 110*b*, 110*c*.

Label 100 may be modified as follows. The upper web may be provided as a clear pressure sensitive film. The adhesive release coating or varnish is printed over the entirety of the upper surface of the lower or base web, rather than only selectively as in the embodiment discussed above.

That is, varnish is applied to the entireties of the surfaces of first layers 115*a*, 115*b*, and 115*c* adjacent second layers 118*a*, 118*b*, and 118*c*. Both sides of the base web are printed with as many colors as desired. Primary indicia are printed on the upper surface of first layer 115*a*. After the varnish is UV cured, the upper web is laminated onto the base web as described above. Selected portions of the upper, clear surface of the upper web are printed and the upper web is then die cut to form secondary labels. Thereafter, the waste matrix may be removed and the composite web cut and folded, and ultimately applied to a transfer tape, as discussed above. Secondary labels may be formed on panel 110*a* by cutting through the clear film and down to the varnish coated surface of the base web.

The modified version of label 100 would have the following characteristics. First, secondary labels may be provided on panel 110*a* because a varnish coating is provided between layers 115*a* and 118*a*. If the user chooses to tear away panels 110*b* and 110*c* as discussed above, any secondary labels formed on panel 110*a* will remain with the container until thereafter removed from panel 110*a*. The primary indicia printed on the upper surface of layer 115*a* is permanently secured to any container to which label 100 is applied and may be viewed through the clear film.

Figure 6:
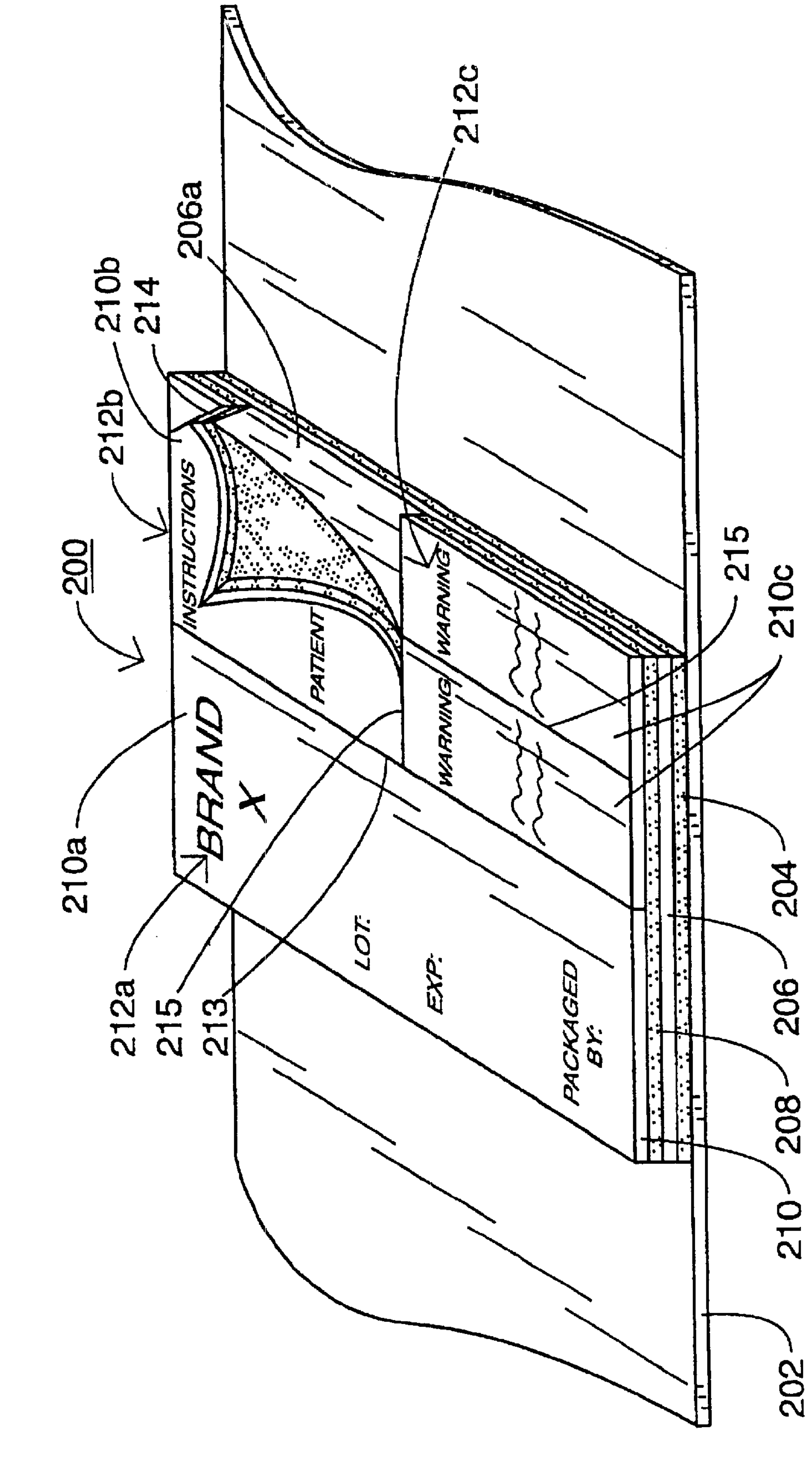
FIG. 6 is a perspective view of a label according to a second embodiment of the present invention wherein one of the secondary labels is partially removed.
Figure 7:
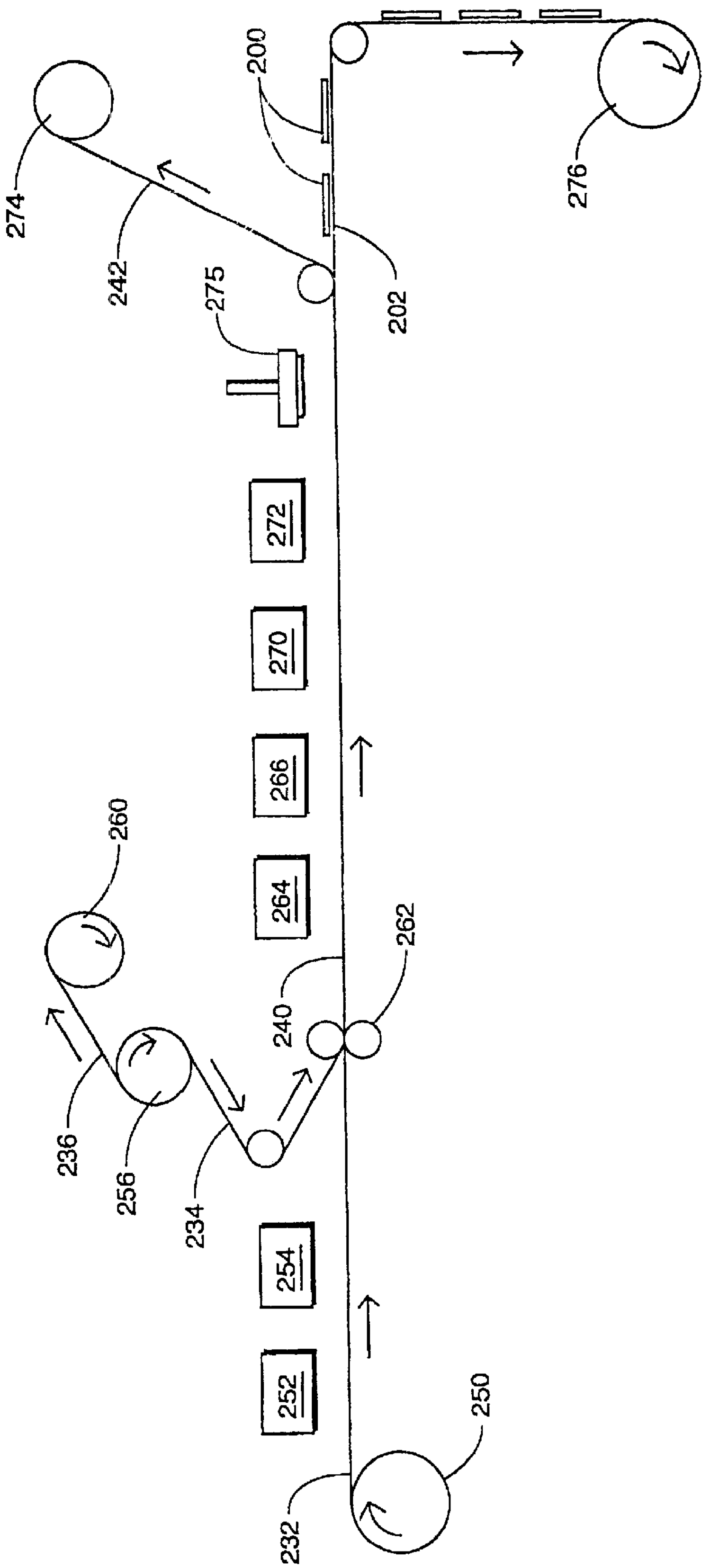
FIG. 7 is a schematic diagram showing an apparatus for forming labels according to the second embodiment.

With reference to FIGS. 6 and 7, a label according to a second embodiment of the present invention, generally denoted by the numeral 200, is shown therein. Label 200 is carried on release liner 202 and may be secured to a container or the like.

Label 200 includes base layer 206 releasably adhered to release liner 202 by pressure sensitive adhesive 204. When label 200 is removed from release liner 202, adhesive 204 separates from the release liner and remains on the underside of base layer 206, providing a pressure sensitive label. Top layer 210 is adhered to the upper surface of base layer 206 by pressure sensitive adhesive 208. Portion 210*a* (hereinafter "primary label 210*a*") is substantially permanently adhered to the upper surface of base layer 206. The portions of the upper surface of base layer 206 which are disposed under portions 210*b* and 210*c* (hereinafter "secondary labels 210*b*,210*c*") of top layer 210 are coated with a release varnish 206*a* such that secondary labels 210*b*,210*c* are releasably adhered to base layer 206. When each of secondary labels 210*b*,210*c* are removed from base layer 206, the underlying adhesive 208 separates from the varnish coated surface and remains on the underside of the secondary label, providing a pressure sensitive label. Indicia 212*a*, 212*b*, and 212*c* may be provided on each of primary label 210*a* and secondary labels 210*b*,210*c*, respectively. Primary label 210*a* and secondary labels 210*b*,210*c* are separated by cut lines 213,215 each of which extend down to the varnish coated surface. Cut line 214 may be provided to facilitate removal of secondary label 210*b*.

Preferably, the relative adherence between adhesive layer 204 and any intended surface (e.g., a container) and the adherence between adhesive 204 and the lower surface of base layer 206 are significantly less than the adherence between adhesive layer 208 and the varnish coated portions of the upper surface of base layer 206. In this way, when label 200 is secured to a container and the user pulls up on a secondary label 210*b*,210*c*, base layer 206 and, therefore, primary label 210*a* will remain secured to the container. Preferably, adhesive 208 is substantially permanently adhered to the portion of the upper surface of base layer 206 underneath primary label 210*a* and the lower surface of primary label 210*a* so that any attempt to separate the primary label from the base layer will be made difficult or impossible without mutilation of the label.

The following example merely illustrates one of many uses for label 200, as well as label 100 as described above. A pharmaceutical distributor, for example, may package relatively large quantities of goods in bulk containers. The pharmaceutical distributor would remove label 200 from release liner 202 and adhere it to the bulk container by means of adhesive layer 204. Indicia 212*a* of primary label 210*a* may include, for example, as shown, a brand name for the goods, lot and expiration information regarding the goods, instructions to a secondary distributor, and quality control information such as the packager of the goods. The secondary distributor, such as a physician or pharmacist, would receive the bulk packaged goods with label 200 adhered thereto. For each subpackage (e.g., packages containing a smaller quantity of goods for individual patients), the pharmacist would remove one of secondary labels 210*c* and adhere the secondary label 210*c* to the individual container by means of adhesive 208. Further, if the secondary distributor desires, he may remove secondary label 210*b* and place it in a conspicuous location. Indicia 212*b* may include, for example, warnings and instructions for patients. Moreover, label 200 may be constructed to include several secondary labels 210*b* so that a secondary label 210*b* may be applied to each individual patient container.

Label 200 as discussed above may be formed as follows. A six color Mark Andy 2200 flexographic printing press as discussed above may be used.

With reference to FIG. 7, self-adhesive stock web 232 is supplied from unwind stand 250. Self-adhesive stock web 232 preferably consists of a web of face stock releasably adhered to a release liner by means of a pressure sensitive adhesive coating. Self-adhesive stock web 232 may be, for example, high gloss paper with S246 adhesive available from Fasson.

Simultaneous with the supply of base web 232, self-adhesive stock web 234 is supplied from unwind stand 256. Self-adhesive stock web 234 may be provided as a self-adhesive face stock having a release liner, the release liner 236 simultaneously being removed to rewind stand 260. Self-adhesive stock web 234 may be, for example, high gloss paper with S246 adhesive available from Fasson.

Base web 232 first passes through varnish printer station 252 at which point silicon varnish is applied to selected portions of base web 232. More particularly, the selected portions correspond to the portions of the upper surface of base layer 206 adjacent secondary labels 210*b* and 210*c*. Thereafter, base web 232 passes through UV curing unit 254 in order to cure the applied varnish coating.

Base web 232 and self-adhesive stock web 234 are married at nip rollers 262, thereby forming multi-layer composite web 240. Notably, where varnish has not been applied by varnish print station 252 (i.e., adjacent primary label 210*a*), the two webs are substantially permanently adhered. Where varnish has been applied (i.e., adjacent secondary labels 210*b* and 210*c*), the webs are releasable adhered.

Composite web 240 is drawn through one or more print stations 264,266 to apply indicia 212*a*, 212*b*, 212*c*. Though not shown, the upper surface of base web 232 may be printed on as well prior to the application of the varnish.

Thereafter, composite web 240 is passed through varnish print station 270 which applies an overprint varnish to protect the aforesaid indicias. Coated composite web 240 is then passed through UV curing unit 272 to cure the varnish.

Composite web 240 is diecut by cutter 275 down to release liner 202 to form labels 200 and down to the face stock of web 232 to form cut lines 213,215 and, thus, secondary labels 210*b*,210*c*. Alternatively, the cut lines forming the label and the secondary labels may be executed by separate diecutters. The resulting waste matrix 242 (the portions of web 240 outside base 206) is taken up on rewind stand 274. The remaining construction which consists of label 200 disposed on release liner 202 may then be rewound onto rewind stand 276. Alternatively, the remaining construction may be sheeted and stacked.

Figure 8:
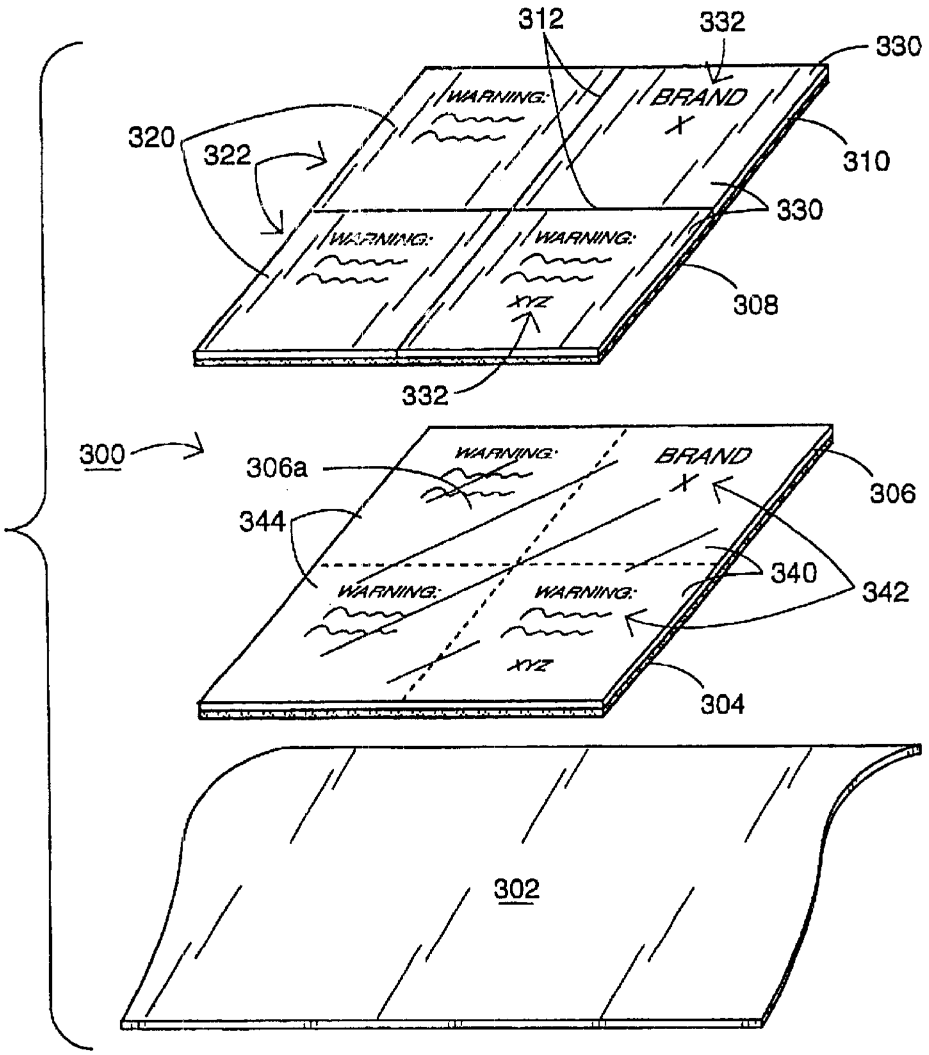
FIG. 8 is an exploded, perspective view of a label according to a third embodiment of the present invention.
Figure 9:
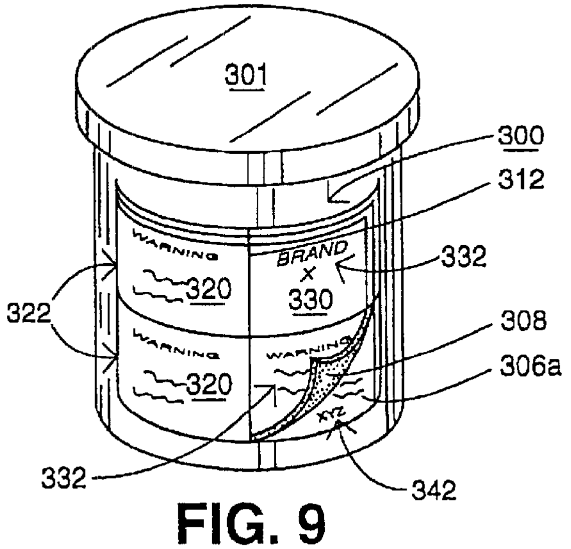
FIG. 9 is a perspective view of the label according to the third embodiment mounted on a container and wherein one of the secondary labels is partially removed.

With reference to FIGS. 8 and 9, a label according to a third embodiment of the present invention, generally denoted by the numeral 300, is shown therein. Label 300 is carried on release liner 302 and may be secured to a container 301 or the like.

Label 300 includes base layer 306 releasably adhered to release liner 302 by pressure sensitive adhesive 304. When label 300 is removed from release liner 302, adhesive 304 separates from the release liner and remains on the underside of base layer 306, providing a pressure sensitive label. For the purposes of explanation, the upper surface of base layer 306 is divided into four regions 340,344 as defined by dotted lines. Regions 340 are provided with primary indicia 342. The entire upper surface of base layer 306 is coated with varnish 306*a*.

Top layer 310 is releasably adhered to the upper surface of base layer 306 by pressure sensitive adhesive 308. Cut lines 312 define secondary labels 320, and tertiary labels 330. Secondary labels 320 are provided with secondary indicia 322. Tertiary labels 330 are provided with tertiary indicia 332. Tertiary indicia 332 is preferably identical to the primary indicia 342 of the underlying region 340.

In use, label 300 may be removed from release liner 302 by separating adhesive 304 from release liner 302. Label 300 is then adhered to container 301, for example, by means of pressure sensitive adhesive 304. When desired, one or both of secondary labels 320 may be removed from the respective region 344 of base layer 306, varnish coating 306*a* allowing pressure sensitive adhesive 308 to remain with the secondary label 320. Moreover, if one or both of tertiary labels 330 are removed, deliberately or inadvertently, indicia 342 of underlying regions 340 will be exposed, thereby serving the function of a primary label. Further, it will be appreciated that if permanent pressure sensitive adhesive as preferred is used, regions 340 of base layer 306 cannot be removed from container 301.

Label 300 may be formed according to the same method and using the same apparatus as label 200 as discussed above, except for the following. In the case of label 300, the step of printing on the upper surface of base layer 306 is not optional, but rather primary indicia 342 must be printed. Preferably, primary indicia 342 are printed on the upper surface of base layer 306 prior to the application of varnish 306*a*. Second, varnish 306*a* must be applied over the entire upper surface of base layer 306, or in any event, on at least all portions of the upper surface of base layer 306 which are to underlie top layer 310. This may be accomplished by flood coating, for example.

Figure 10:
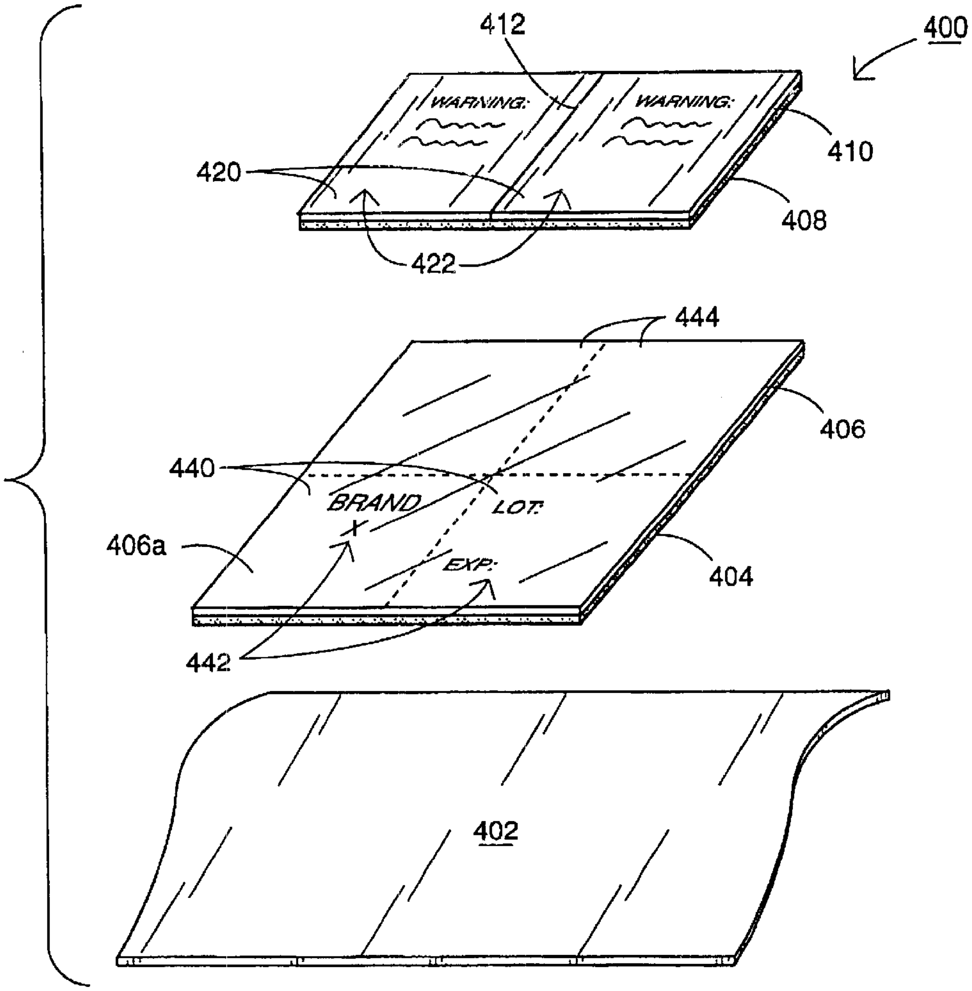
FIG. 10 is an exploded, perspective view of a label according to a fourth embodiment of the present invention.
Figure 11:
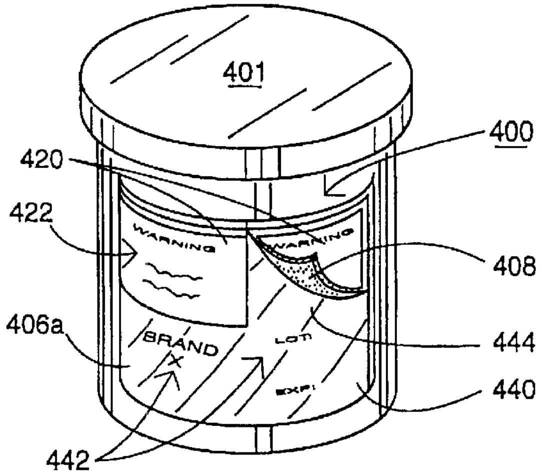
FIG. 11 is a perspective view of the label according to the fourth embodiment mounted on a container and wherein one of the secondary labels is partially removed.

With reference to FIGS. 10 and 11, a label according to a fourth embodiment of the present invention, generally denoted by the numeral 400, is shown therein. Label 400 is carried on release liner 402 and may be secured to a container 401, for example, or the like.

Label 400 includes base layer 406 releasably adhered to release liner 402 by pressure sensitive adhesive 404. When label 400 is removed from release liner 402, adhesive 404 separates from the release liner and remains on the underside of base layer 406, providing a pressure sensitive label. For the sake of explanation, base layer 406 is divided into regions 440,444 defined by the dotted lines. Primary label regions 440 are provided with primary indicia 442. The entire upper surface of base layer 406 is coated with varnish 406*a*.

Top layer 410 is adhered to the upper surface of base layer 406 by pressure sensitive adhesive 408. Cut line 412 defines secondary labels 420. Secondary labels 420 each include adhesive 408 on their underside and are provided with indicia 422 on their upper surface. When label 400 is constructed as shown in FIG. 11, secondary labels 420 overlie regions 444 of base layer 406. Secondary labels 422 are releasably adhered to the upper surface of base layer 406 by the interface of adhesive 408 and varnish 406*a*.

Label 400 may be used substantially in the manner as described above with respect to labels 100, 200, and 300. Label 400 may be removed from release liner 402 and adhered to a container 401, for example, by means of adhesive 404. When desired, one or both of secondary labels 420 may be peeled away from the varnish coated upper surface of base layer 406 and adhered to a second container by means of adhesive 408. Notably, primary label regions 440 which form a part of base layer 404 remain with container 401.

Label 400 as discussed above may be formed substantially according to the process and using the apparatus as discussed above with respect to label 200, except for the following. The upper self-adhesive stock web (i.e., corresponding to stock web 234) is provided in a width less than that of the lower self-adhesive stock web (i.e., corresponding to self-adhesive stock web 232). Alternatively, the upper self-adhesive stock web may be slit prior to marrying it with the lower self-adhesive stock web, the portion of the web corresponding to secondary labels 420 being married to the lower web and the remainder being removed by a rewinding station. Second, varnish 406*a* must be applied over the entire upper surface of base layer 406, or in any event, on at least all portions of the upper surface of base layer 406 which are to underlie top layer 410. This may be accomplished by flood coating, for example.

Figure 12:
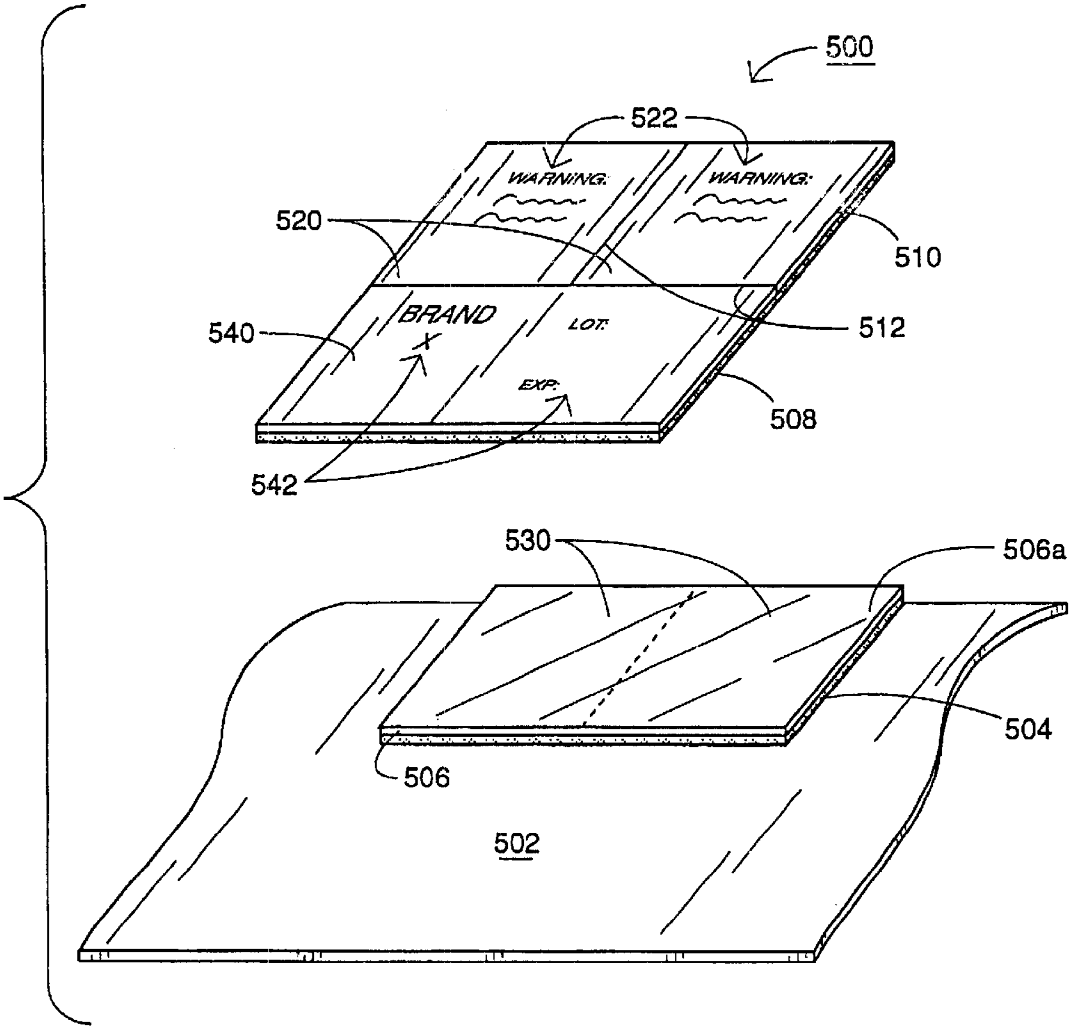
FIG. 12 is an exploded, perspective view of a label according to a fifth embodiment of the present invention.
Figure 13:
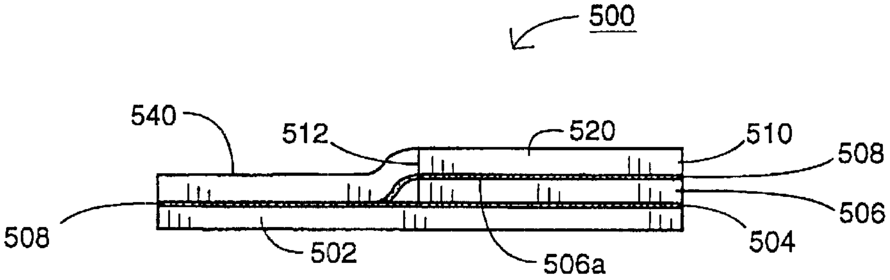
FIG. 13 is a front elevational view of the label according to the fifth embodiment on a release liner.

With reference to FIGS. 12 and 13, a label according to a fifth embodiment of the present invention, generally denoted by the numeral 500, is shown therein. Label 500 is carried on release liner 502 and may be secured to a container or the like.

Label 500 includes base layer 506 releasably adhered to release liner 502 by pressure sensitive adhesive 504. Notably, the width of base layer 506 is less than the width of release liner 502. When label 500 is removed from release liner 502, adhesive 504 (as well as a portion of adhesive layer 508, as discussed below) separates from the release liner and remains on the underside of base layer 506, providing a pressure sensitive label. To aid in explanation, base layer 506 is divided into regions 530 defined by the dotted line. The entire upper surface of base layer 506 is coated with varnish 506*a*.

Top layer 510 is coated on its underside with pressure sensitive adhesive 508. Secondary labels 520 and primary label 540 are defined by cut lines 512. Secondary labels 520 are provided with secondary indicia 522. Primary label 540 is provided with primary indicia 542. As best seen in FIG. 13, the portion of pressure sensitive adhesive 508 underlying primary label 540 is releasably adhered to release liner 502. The portion of pressure sensitive adhesive 508 underlying secondary labels 520 is releasably adhered to the upper surface of base layer 506, varnish 506*a* providing the releasability.

In use, label 500 is removed from release liner 502 and applied to a container or the like. Adhesive 504 and the portion of adhesive 508 underlying primary label 540 will adhere to the container, preferably permanently. Secondary labels 520 may be peeled away from the varnish coated upper surface of base layer 506 as desired and applied to other containers, for example.

Label 500 may be formed according to the same method and using the same apparatus as discussed with regard to label 200 above, except for the following. Prior to marrying the upper and lower webs, the base web is die cut lengthwise and the unwanted portion is removed, leaving the portion which ultimately becomes base layer 506 on release liner 502. The top web is then laminated onto the lower web such that secondary labels 520 overlie regions 530. Second, varnish 506*a* must be applied over the entire upper surface of base layer 506, or in any event, on at least all portions of the upper surface of base layer 506 which are to underlie top layer 510. This may be accomplished by flood coating, for example.

Figure 14:
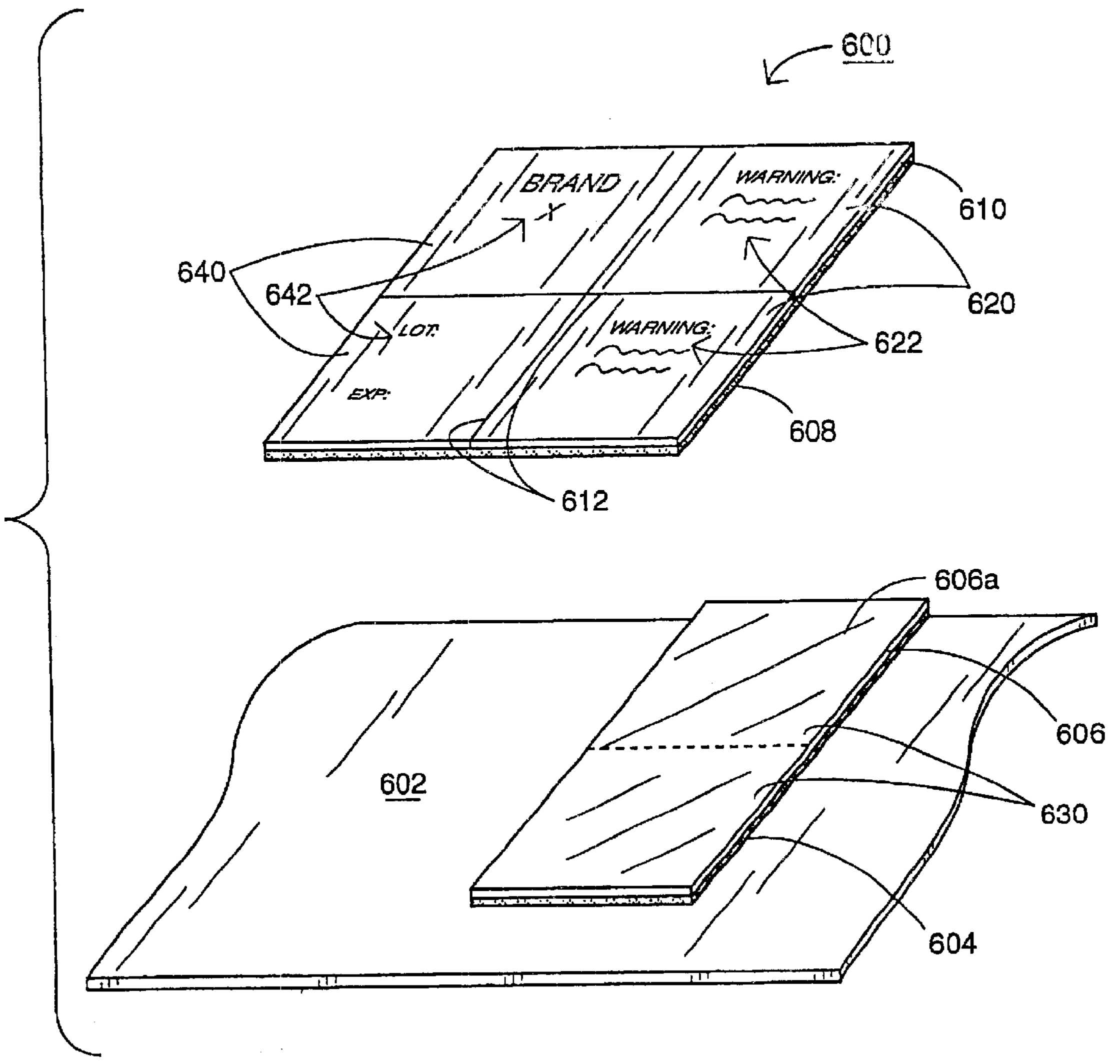
FIG. 14 is an exploded, perspective view of a label according to a sixth embodiment of the present invention.
Figure 15:
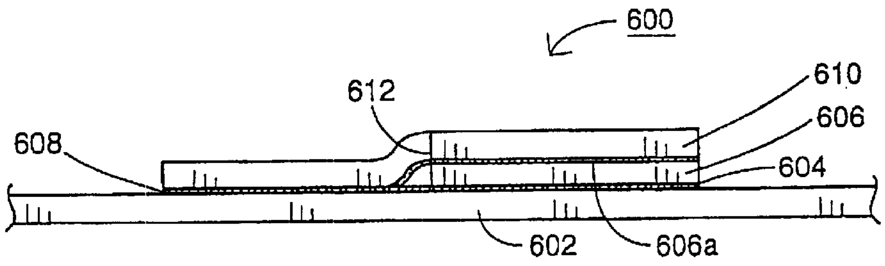
FIG. 15 is a side elevational view of the label according to the sixth embodiment on a release liner.

With reference to FIGS. 14 and 15, a label according to a sixth embodiment of the present invention, generally denoted by the numeral 600, is shown therein. Label 600 is carried on release liner 602 and may be secured to a container or the like.

Label 600 is substantially the same as label 500. Elements 604, 606, 606*a*, 608, 610, 612, 620, 622, 630, 640, and 642 correspond to elements 504, 506, 506*a*, 508, 510, 512, 520, 522, 530, 540, and 542, respectively. Label 600 differs from label 500 in that regions 630, secondary label 620, and primary label 640 are reoriented with respect to the length of release liner 602. Accordingly, a side view of label 600 as shown in FIG. 15 is identical to an end view of label 500 as shown in FIG. 13.

Label 600 may likewise be formed using substantially the same method and apparatus as described above with regard to label 200, except as follows. As in the formation of label 500, prior to marrying the upper and lower webs, the lower web is die cut to form base layers 606 in the indicated shape. Preferably, the cut lines transverse to the web do not extend as far as at least one side edge of the web so that a lengthwise strip of face stock continues along the edge of the web and adjacent base layer 606 so that the waste matrix is continuous. This aids in the removal of the waste matrix. After the waste matrix has been removed, the top web is laminated onto the lower web such that secondary labels 620 are mated with regions 630. Second, varnish 606*a* must be applied over the entire upper surface of base layer 606, or in any event, on at least all portions of the upper surface of base layer 606 which are to underlie top layer 610. This may be accomplished by flood coating, for example.

Figure 16:
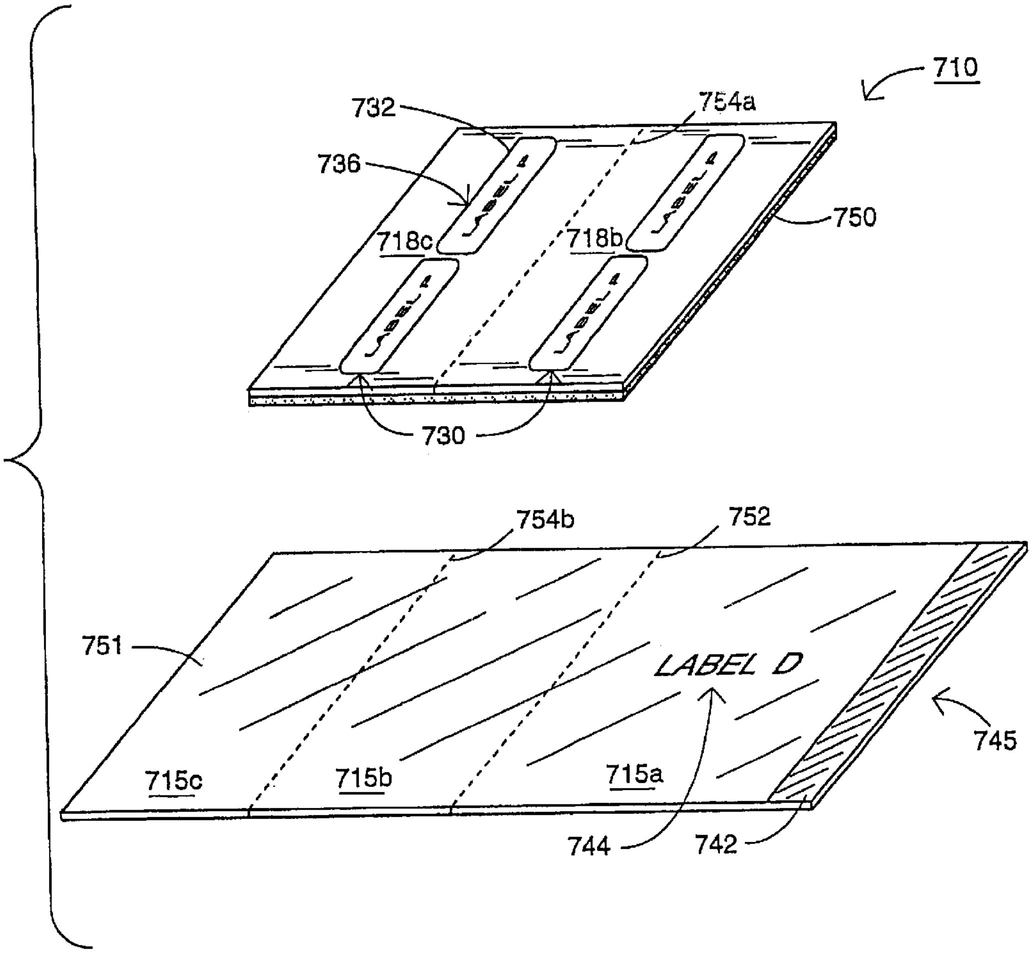
FIG. 16 is an exploded, perspective view of a leaflet according to a seventh embodiment of the present invention.
Figure 17:
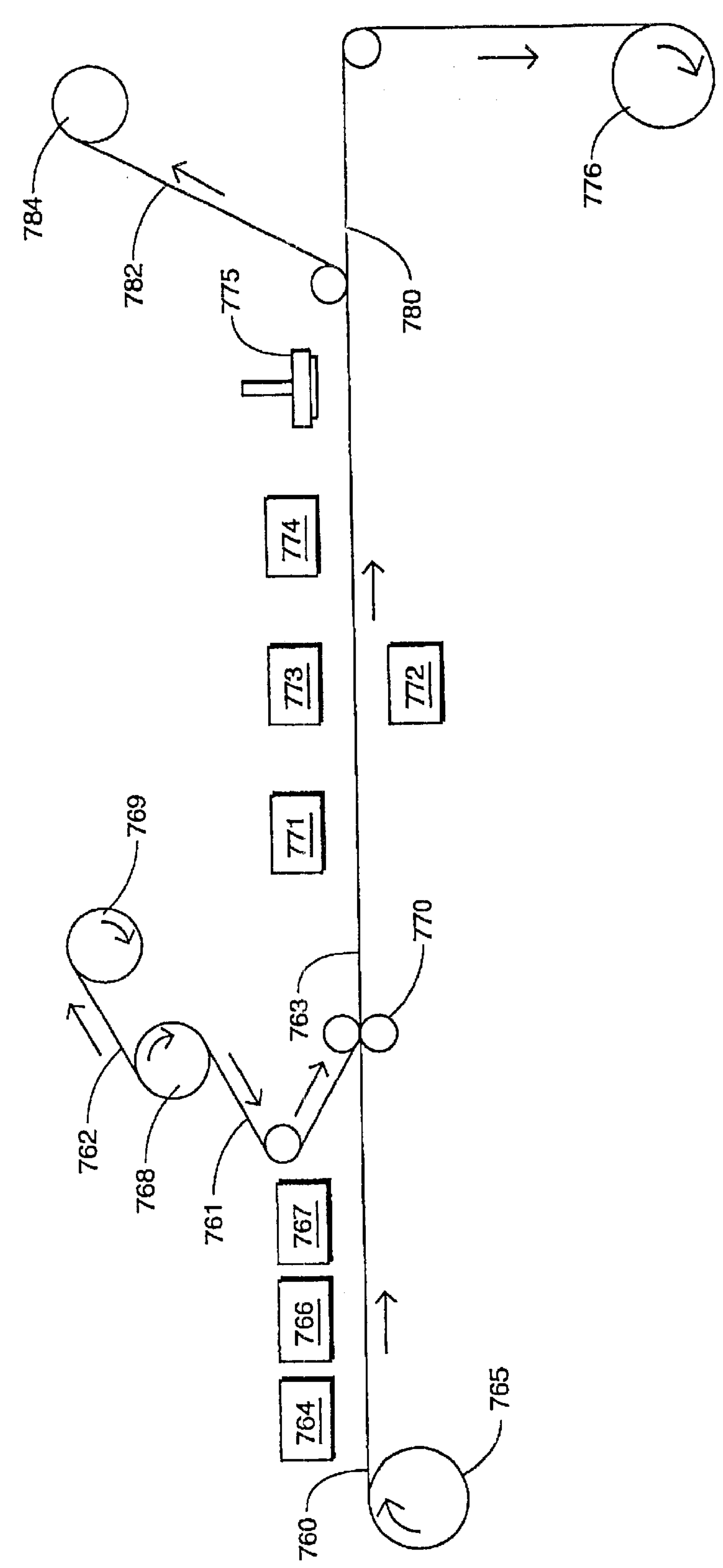
FIG. 17 is a schematic diagram showing an apparatus for forming leaflets according to the seventh embodiment.

With reference to FIGS. 16 and 17, a leaflet, generally denoted by the numeral 710, may be incorporated into a label according to a seventh embodiment of the present invention. As will be appreciated from the following discussion, leaflet 710 is functionally substantially the same as leaflet 110 as described above. Accordingly, leaflet 710 may be covered by a laminate cover corresponding to cover 120, disposed on an adhesive patch corresponding to adhesive patch 114, which may in turn be disposed on a release liner corresponding to release liner 112 or on a container.

Turning to leaflet 710 in greater detail, the leaflet includes first layers 715*a*, 715*b*, and 715*c* corresponding to first layers 115*a*, 115*b*, and 115*c* of the first embodiment, respectively. Leaflet 710 further includes second layers 718*b* and 718*c* corresponding to second layers 118*b* and 118*c*, respectively, of the first embodiment. Notably, there is no portion of leaflet 710 which corresponds to second layer 118*a* of the first embodiment. Thus, first layer 715*a* itself serves as a primary label or panel whereas primary label 110*a* of the first embodiment is a two-ply construction.

Elements 730, 732, 736, 742, 744, 745, and 752 correspond to elements 130, 132, 136, 142, 144, 145, and 152, respectively, of the first embodiment. Element 750 is adhesive corresponding to elements 150*b* and 150*c*. Tear lines 754*a* and 754*b* correspond to tear line 154 of leaflet 110.

Whereas in the case of leaflet 110 only the upper surfaces of first layers 115*b* and 115*c* are coated with varnish, the upper surfaces of first layers 715*a*, 715*b*, and 715*c* are each completely coated with varnish. Also, primary indicia 744 is printed on the upper surface of first layer 715*a* rather than on a superimposed second layer.

Leaflets 710 as described above may be formed as follows. A six color Mark Andy 2200 flexographic printing press may be used to form leaflet 710, however, any suitable apparatus may be used. Other suitable apparatus include letter presses and offset presses.

With reference to FIG. 17, base web 760 is supplied from unwind stand 765. Simultaneous with the supply of base web 760, self-adhesive stock web 761 is supplied from unwind stand 768. Base web 760 ultimately forms first layers 715*a*, 715*b*, 715*c* of the resulting leaflets 710. Self-adhesive stock web 761, with release liner 762 removed, ultimately forms second layers 718*b*,718*c* of leaflets 710.

Base web 760 is preferably a simple base stock formed from paper and having no adhesive layer or release liner. Base web 760 first passes through print station 764 which prints primary indicia 744 on the upper surface of the portion of base web 760 which ultimately becomes first layer 715*a* of the resultant leaflet. Thereafter, base web 760 passes through varnish printer station 766 at which point varnish (including varnish strip 742) is applied to tile entire upper surface of the base web. Thereafter, base web 760 passes through UV curing unit 767 in order to cure the applied varnish coating.

Self-adhesive stock web 761 may be provided as a self-adhesive face stock having a release liner, the release liner 762 simultaneously being removed to rewind stand 769. Self-adhesive stock web 761 may be, for example, high gloss paper with S246 adhesive available from Fasson.

Base web 760 and self-adhesive stock web 761 are married at nip rollers 770, thereby forming multilayer composite web 763. Notably, webs 760 and 761 are releasably adhered throughout the length of composite web 763.

Composite web 763 is drawn through one or more print stations 771 to apply graphics and indicia including secondary indicia 736. Composite web 763 may also pass through any number of print stations 772 to print graphics and other indicia on the lower surface of the base web (i.e., to apply indicia corresponding to indicia 117*b*, 117*c* of leaflet 110).

Composite web 763 then passes through varnish print station 773 which applies an overprint varnish to protect the indicias applied at print stations 771,772. Coated composite web 763 then passes through UV curing unit 774 to cure the varnish.

Composite web 763 is then die cut by die cut station 775 down to base web 760 to form cut lines 732 which define secondary labels 730. Die cut station 775. also forms a cut line through upper web 761 down to base web 760. This cut line defines the edge of second layer 718*b* adjacent first layer 715*a*.

The portion of upper web 761 overlying the portion of base web 760 corresponding to first layer 715*a* (i.e., the portion of upper web 761 corresponding to first layer 118*a* of leaflet 110) is then removed by rewind station 784. Preferably, the die cut station also makes cut lines parallel to the length of the web and the cut lines transverse to the web do not extend as far as at least one side edge of the web. As a result, a lengthwise strip of face stock continues along the edge of the web so that the waste matrix 782 is continuous.

The resulting construction 780 may thereafter be "sheeted" into individual strips and stacked or, alternatively, rewound onto rewind stand 776 and later cut into individual strips. Alternatively, web construction 780 may be cut and folded on a roll folder.

Labels may be formed using leaflets 710 by the method described for forming labels 100 from leaflets 110. Moreover, leaflet 710 and labels therefrom will have substantially the same characteristics and may be used in substantially the same manner as leaflets 110 and labels 100.

Further, leaflets 710 and labels formed therefrom may include any number of unadhered panels.

Figure 18:
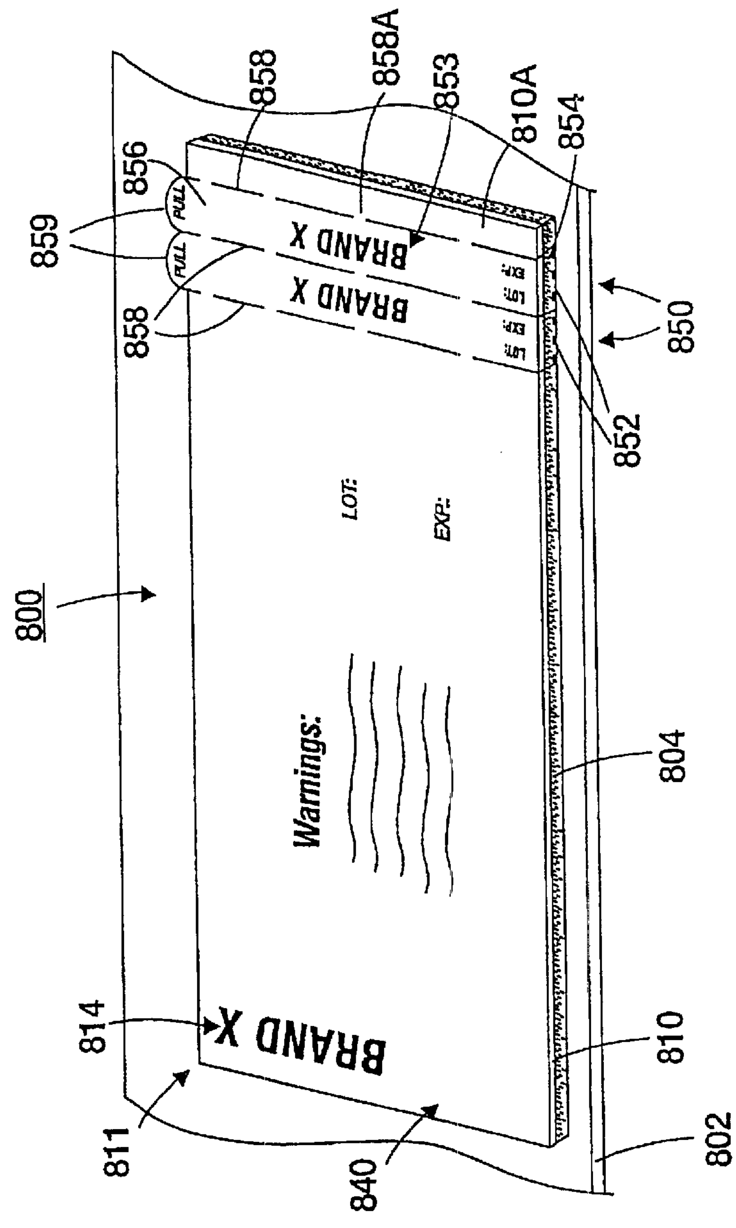
FIG. 18 is a perspective view of a single ply label according to an eighth embodiment on a release liner.

With reference to FIG. 18, a label 800 according to an eighth embodiment is shown therein disposed on a release liner 802. Label 800 includes primary label 840 and removable secondary labels 850. Label 800 is "single ply" as will be appreciated from the following description.

Turning to the construction of label 800 in greater detail, label 800 includes base label 811. Base label 811 includes base face stock layer 810 coated on its rear surface with pressure sensitive adhesive 804. Perforation lines 858 are formed through base layer 810 and adhesive layer 804 down to release liner 802. Perforation lines 858 define primary label 840 to the left, secondary labels 850 therebetween, and marginal portion 810A adjacent the right end edge of the base label. Notably, perforations 858 include ties or bridges 858A. Preferably, the cuts of perforations 858 are on the order of a quarter inch in length with the ties 858A each being about 1/32 of an inch in length. Each secondary label 850 includes a face stock layer 856 forming a part of base layer 810 and is coated on its undersurface with a portion of adhesive 804 denoted 854. Pull tabs 859 form a part of face stock layer 856 and preferably extend beyond an edge of primary label 840. Secondary labels 850 have indicia 853 printed thereon. Primary label 840 has indicia 814 printed thereon.

Figure 19A:
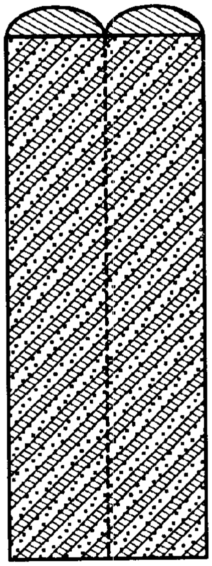
FIGS. 19A–19E are a schematic, bottom plan views showing various patterns of adhesive deadener on the secondary labels of the eighth embodiment.
Figure 19B:
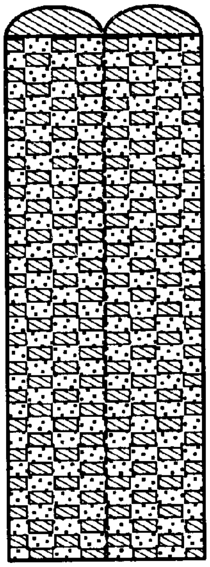
Figure 19C:
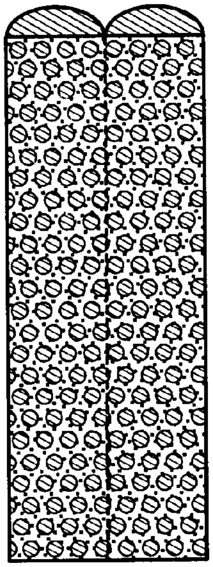
Figure 19D:
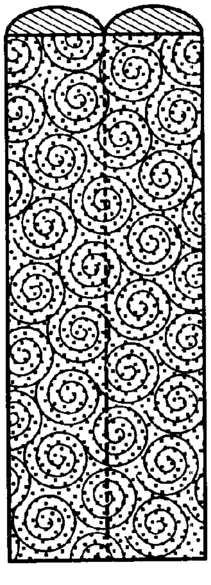
Figure 19E:
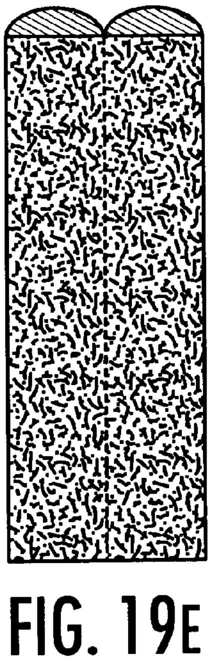

The lower surface of adhesive 854 is pattern coated with adhesive deadener 852. Suitable adhesive deadeners include Radcure 800 available from Radcure Corporation of Livingston, N.J. Adhesive 854 is pattern coated with the adhesive deadener such that a reduced portion of activated or tacky adhesive is exposed. The pattern of adhesive deadener may be selectively chosen for the intended application. For example, striped (FIG. 19A), checkered (FIG. 19B), dotted (FIG. 19C), spiralled (FIG. 19D), or diffuse (FIG. 19E) patterns may be used. It has been found that the spiral pattern as shown in FIG. 19D performs best in most applications. The adhesive on the undersurface of pull tabs 859 is preferably fully coated with adhesive deadener.

In use, label 800 may be applied to a suitable container using conventional methods such as automated application equipment. As the label is being delaminated from the release liner and applied to the container, ties 858A serve to hold the label together. Once applied to the container, primary label 840 and marginal portion 810A are permanently adhered to the container by adhesive 804. Secondary labels 850 are releasably secured to the container, the reduced adhesive surface in contact with the container allowing the removable labels to be peeled away. The proportions of deadened and exposed adhesive underlying the secondary labels, the characteristics of adhesive 854, and the preferred pattern of adhesive deadener will depend on the intended application and the intended substrates. Preferably, however, from about 40% to about 60% of the adhesive 854 is coated with adhesive deadener 852. Each of secondary labels 850 may be removed by grabbing its respective pull tab 859 which, because it is fully coated with adhesive deadener, is not secured to the container. In some applications, it may be desirable to fully coat the undersides of the pull tabs with adhesive deadener only down to the upper edge of the base layer. In other applications it may be desirable to apply a full coat of adhesive deadener to the undersides of the pull tabs and continuing further down along the secondary labels 850 inwardly of the upper edge in order to give the user a better start in peeling the secondary label away. The secondary label 850 may then be applied to another desired object, for example a patient's record chart. The exposed adhesive 854 serves to secure the secondary label to the new substrate.

Figure 20:
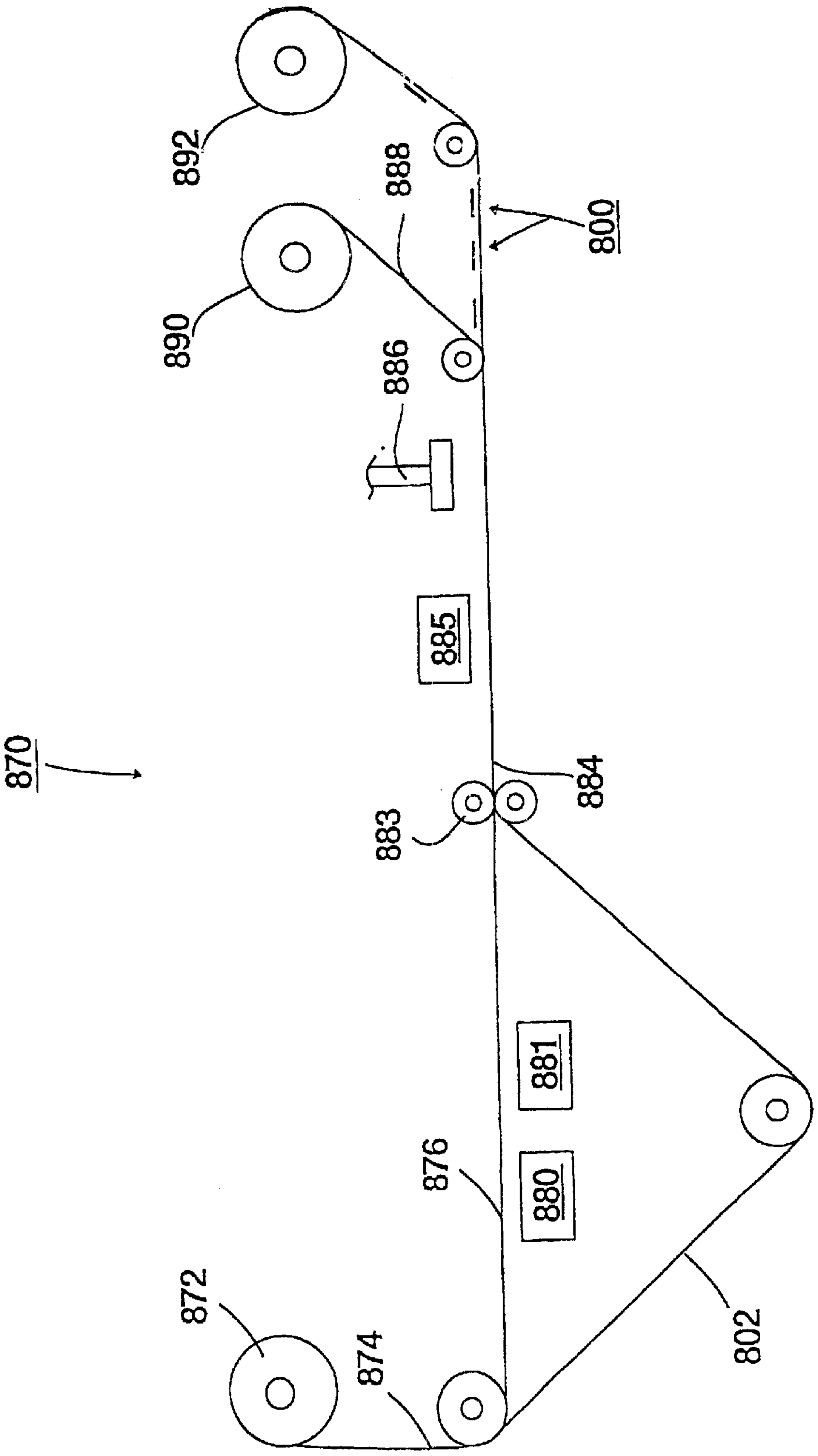
FIG. 20 is a fragmentary, schematic diagram showing an apparatus for forming labels according to the eighth embodiment.

With reference to FIG. 20, an apparatus 870 for forming labels 800 is shown therein. First, a self adhesive face stock 874 including release liner 802 is unwound from unwind station 872. Release liner 802 is delaminated from self adhesive face stock 876 by a suitable arrangement of rollers. Print station 880 applies adhesive deadener 852 (see FIG. 18) to the adhesive surface of web 876 at locations corresponding to secondary labels 850. Adhesive deadener print station 880 is preferably a flexographic printing station. However, station 880 may be any suitable printing means, for example, a screen printer. Curing station 881 thereafter cures adhesive deadener 852. Release liner 802 is then relaminated to the self adhesive surface of face stock 876 by nip rollers 883 to form composite web 884. Indicia 853 is printed on the top surface of web 884 by print station 885. Print station 885 may be the same print station as used to print the other indicia on base layer 810 or a further print station. Optionally, a protective varnish may be applied to the upper surface of web 876 and cured. Die cut station 886 forms perforations 858. Die cut station 886 may be the same die cut station as used to form base labels 811, or a further die cut station. The waste matrix 888 including the portions of web 876 outside of labels 800 is removed by winding station 890. Labels 800 disposed on release liner 802 are wound onto winding station 892 or sheeted and stacked.

Figure 21:
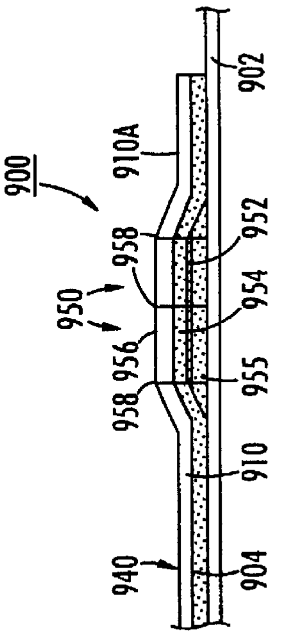
FIG. 21 is a side elevational view of a single ply label according to a ninth embodiment on a release liner.

With reference to FIG. 21, a fragmentary view of a label 900 according to a ninth embodiment of the present invention is shown therein disposed on a release liner 902. Label 900 is substantially the same as label 800 as discussed above except in the manner the secondary labels 950 are secured to the release liner 902 and any intended substrates such as a container or a patient record chart. More particularly, label 900 includes base face stock layer 910 including primary label 940, secondary labels 950, and marginal portion 910A. Base layer 910 is coated on its undersurface with pressure sensitive adhesive 904. Each secondary label 950 includes a face stock layer 956 coated on its undersurface with adhesive 954 forming a part of adhesive layer 904. Whereas the adhesive on the undersurfaces of secondary labels 850 is only pattern coated with adhesive deadener, adhesive 954 is fully (i.e., flood) coated with adhesive deadener 952. Adhesive deadener 952 may be Radcure 800. The lower surface of adhesive deadener layer 952 is in turn coated with adhesive 955. Adhesive 955 is preferably a low tack adhesive. In particular, adhesive 954 should have stronger adhesion to adhesive deadener 952 than adhesive 955. Preferably, adhesive 955 is a totally or easily removable, low tack, hot melt, pressure sensitive adhesive, such adhesives being commonly available. Suitable adhesives for adhesive 955 include product number H2355-01 available from Findley Adhesives, Inc. of Wauwatosa, Wis. Secondary labels 950 are defined by cut lines 958 corresponding to perforation lines 858 which extend down to release liner 902.

Label 900 and secondary labels 950 may be used in substantially the same manner as discussed above with regard to label 800 and secondary labels 850. However, whereas the pattern coating of adhesive deadener allows secondary labels 850 to be removed from the container, it is the nature and characteristics of adhesive 955 which allow secondary labels 950 to be peeled away from the container. Likewise, whereas the pattern coating of adhesive deadener on secondary labels 850 allows them to be readhered to a second substrate such as a doctor's chart, it is again the nature and characteristics of adhesive 955 which allow secondary labels 950 to be readhered to a second substrate.

Figure 22:
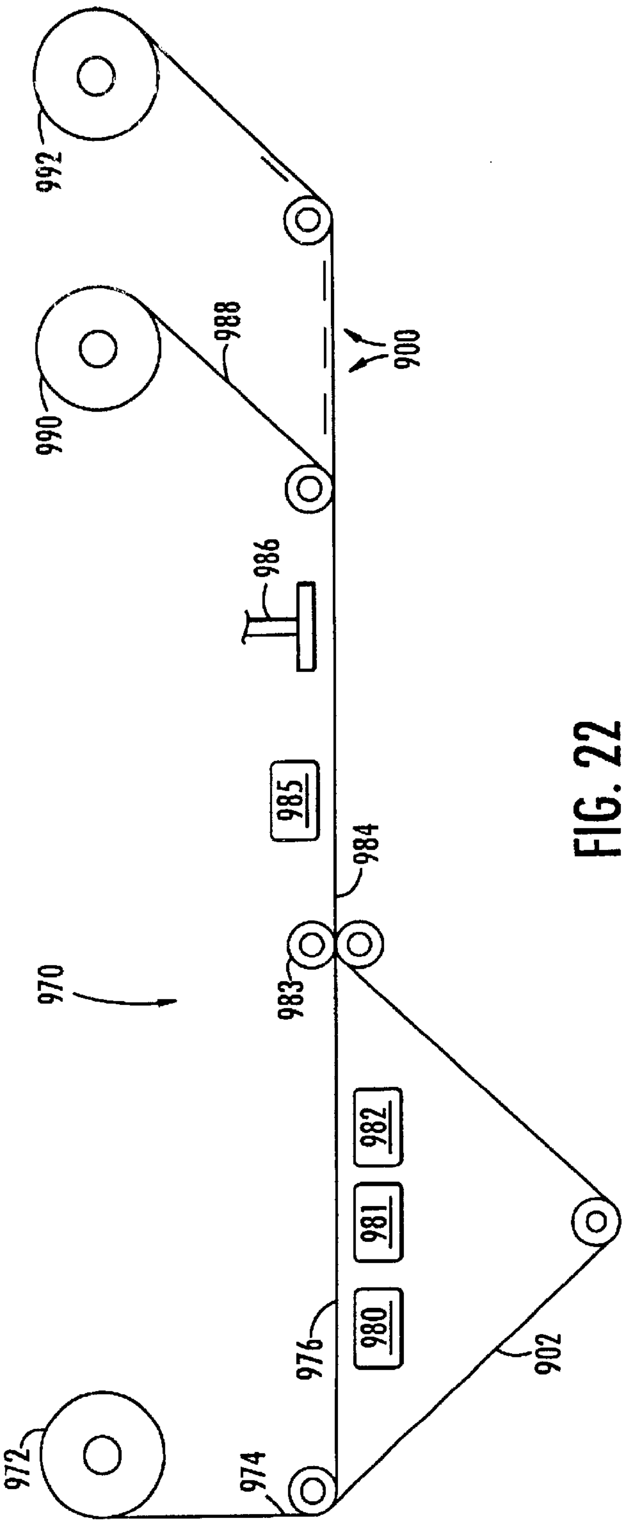
FIG. 22 is a fragmentary, schematic diagram showing an apparatus for forming labels according to the ninth embodiment.

Turning to FIG. 22, an apparatus 970 for forming labels 900 is shown therein. A self adhesive face stock 974 disposed on release liner 902 is unwound from unwind station 972. Release liner 902 is delaminated from self adhesive face stock 976. Adhesive deadener 952 is flood coated by printing station 980 onto the adhesive of web 976 at locations corresponding to secondary labels 950. The adhesive deadener is then cured at curing station 981. Adhesive 955 is applied to the cured adhesive deadener by printing station 982, preferably a Nordson Corporation screen coater. Alternatively, adhesive 955 may be applied to the release liner at locations corresponding to the secondary labels when the release liner is remarried to the self adhesive face stock. Release liner 902 is then relaminated to the adhesive surface of web 976 by nip rollers 983 to form composite web 984. Suitable indicia (not shown) corresponding to indicia 853 of label 800 is printed onto the face stock of web 984 by printing station 985. Print station 985 may be the same print station as used to print other indicia on the base label (e.g., corresponding to indicia 814), or alternatively, may be a separate print station. Optionally, the upper surface of web 976 may be coated with a protective varnish and cured. Die cutter 986 forms perforations 958. Die cutter 986 may be the same die cutter as used to form the base labels, or alternatively, may be a separate die cut station. The waste matrix 988 including the portions of web 976 outside of labels 900 is taken up onto winding station 990. Labels 900 disposed on release liner 902 are wound onto winding station 992 or sheeted and stacked.

Figure 23:
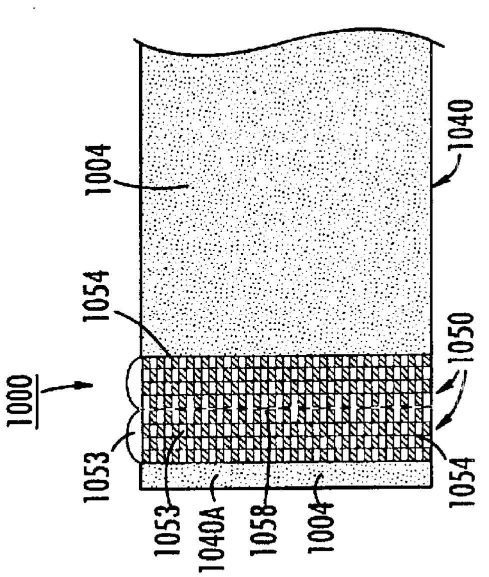
FIG. 23 is a fragmentary, bottom plan view of a label according to a tenth embodiment of the present invention.

With reference to FIG. 23, a label 1000 according to a tenth embodiment of the present invention is shown therein. Label 1000 is substantially the same as label 800 except as follows. Label 1000 includes primary label 1040, secondary labels 1050, and marginal portion **1040*a*. Primary label 1040 and marginal portion 1040*a* are substantially fully coated with adhesive 1004 corresponding to adhesive 804. The undersurfaces of secondary labels 1050 are selectively coated with adhesive 1054 corresponding to adhesive 854. More particularly, the undersurfaces of secondary labels 1050 have adhesive 1054 in prescribed locations such that a pattern of uncoated areas 1053 are defined between the locations of adhesive 1054. As a result, the adhesive voids 1053 provide a pattern of adhesive-free contact surface between the undersurface of the secondary labels and the intended container or other object. The pattern created by the voids 1053 may be any of the patterns contemplated for the adhesive deadener 852** of the eighth embodiment.

Figure 24:
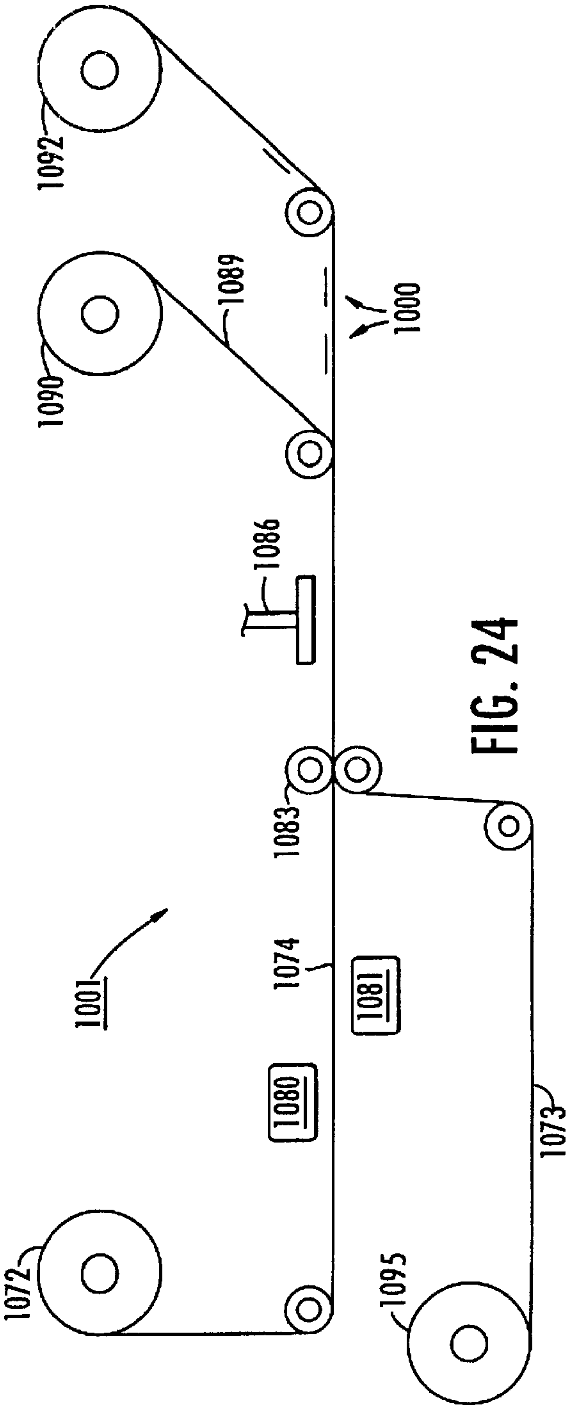
FIG. 24 is a fragmentary, schematic diagram showing an apparatus for forming labels according to the tenth embodiment.

With reference to FIG. 24, an apparatus 1001 for forming labels 1000 is shown therein. Web 1074 of non-pressure sensitive film or paper is unwound from unwind stand 1072. Concurrently, release liner 1073 is unwound from unwind stand 1095. Preferably, release liner 1073 is coated with a release agent only on the upper surface thereof. Suitable print station or stations 1080 print suitable indicia on the top surface of web 1074. Adhesive corresponding to adhesive 1004 and adhesive 1054 is applied to the underside of face stock web 1074 by adhesive applicator 1081. Preferably, adhesive applicator 1081 is a Nordson screen coater. Alternatively, adhesive could be applied to the release coated upper side of release liner 1073. In either case, adhesive 1054 is printed in the prescribed pattern so that areas on the undersurface of face stock web 1074 corresponding to areas 1053 are left uncoated. Stations 1080 and 1081 may be reversed, if desired.

Thereafter, face stock 1074 and release liner 1073 are laminated together by nip rollers 1083. Perforation lines 1058 as well as cut lines defining label 1000 are formed by die cutter 1086. Waste matrix 1089 consisting of the portions of web 1074 not within labels 1000 is taken up onto waste roll 1090. Labels 1000 are wound onto rewind roll 1092.

While the secondary labels of labels 800 and 900 have been described as strips preferably having pull tabs, it will be appreciated that the secondary labels may be configured as described and shown with respect to any of the aforedescribed labels. For example, the secondary labels may be defined within it the periphery of the base label.

It will be appreciated that the provision of UV curable silicon varnish or the like as described with respect to labels 100 and 200 provides certain advantages. There is a reduced or eliminated tendency for adhesive to migrate into the areas where varnish has been applied, unlike the case where adhesive deadener is used. Further, graphics underlying the varnish, if any, are protected so that they are not mutilated or obliterated by the removal of the overlying secondary label portions.

A primary advantage of each of the disclosed embodiments employing a varnish coating is that virtually any combination of base web and pressure sensitive adhesive (i.e., on the underside of the secondary label or labels) may be used. The securement between the secondary label and the base layer is a function of the adhesion between the varnish and the adhesive. The degree of adhesion may be controlled by the selection of the varnish material. As a result, if desired, the secondary label may be provided with an aggressive "high-tack" or permanent adhesive without compromising the convenient separability of the secondary label from the base layer.

It will be appreciated that each of the labels described above, as well as leaflet 110, address the problem of mismatching primary and secondary labels. Because the leaflet 110 and labels are formed as a unitary construction and both the primary and secondary portions are printed while the construction is in a unitary configuration, there is no danger that the primary and secondary portions will be improperly mated.

In each of the third, fourth, fifth, sixth, and seventh embodiments if the entire upper surface of the respective base layer is flood coated with varnish as preferred, the efficiency and quality of label construction is greatly enhanced. This is because the need to properly register the printed varnish is substantially reduced or eliminated.

It will be appreciated that the labels as described may be used for a wide variety of purposes. For example, the label may be secured to a container with the secondary labels being readhered to a patient chart, for example. The label could be adhered to a bulk container with the secondary labels being applied to individual packages filled from the bulk container. The secondary labels may be used to track the movement or progress of a package, manifest, or other object. Thus, possible substrates to which the labels and secondary labels may be applied include a wide variety of articles including containers, charts, logs, etc.

While a preferred embodiment of the present invention has been described, it will be appreciated by those of skill in the art that certain modifications may be made without departing from the scope of the present invention. All such modifications are intended to come within the scope of claims which follow.

What is claimed is:

1. A method for forming a label product made up of first and second labels formed integrally together in which the first label includes primary information to be used on a first substrate and the second label includes secondary information to be used on a second substrate, said method comprising the steps of:

a) unwinding a base web having upper and lower surfaces and a base adhesive coating the lower surface;

b) selectively applying adhesive deadener to the base adhesive;

c) applying a second adhesive to the adhesive deadener;

d) printing primary and secondary indicia on the upper surface of the base web, the primary indicia representing the primary information concerning the first substrate and the secondary indicia representing the secondary information concerning the second substrate; and e) cutting the base web to form cut lines defining a permanent portion and a temporary portion, each forming a part of the base web, such that the primary indicia is disposed on the permanent portion and the secondary indicia disposed on the temporary portion, and such that at least a portion of the adhesive deadener and at least a portion of the second adhesive underlie the temporary portion.

2. The method of claim 1 further including the step of curing the adhesive deadener following the step of applying the adhesive deadener.

3. The method of claim 1 further including the step of marrying a release liner to the base adhesive of the base web following the step of applying the adhesive deadener.

4. The method of claim 3 further including the step of delaminating the release liner from the base web prior to applying the adhesive deadener.

5. The method of claim 1 further including the step of cutting the base web to form cut lines defining at least one tie forming a part of the base layer and connecting the permanent and temporary portions.

6. The method of claim 1 wherein step (b) precedes step (d).

7. The method of claim 1 wherein step (d) precedes step (b).

* * * * *